US011161365B1

(12) United States Patent
Garza

(10) Patent No.: US 11,161,365 B1
(45) Date of Patent: Nov. 2, 2021

(54) SLOTTED RULER

(71) Applicant: My Sweet Petunia, Inc., Sherrard, IL (US)

(72) Inventor: Iliana Garza, Sherrard, IL (US)

(73) Assignee: My Sweet Petunia, Inc., Sherrard, IL (US)

( * ) Notice: Subject to any disclaimer, the term of this patent is extended or adjusted under 35 U.S.C. 154(b) by 265 days.

(21) Appl. No.: 16/489,748

(22) PCT Filed: Jan. 16, 2019

(86) PCT No.: PCT/US2019/013782
§ 371 (c)(1),
(2) Date: Aug. 29, 2019

(87) PCT Pub. No.: WO2020/117294
PCT Pub. Date: Jun. 11, 2020

Related U.S. Application Data

(60) Provisional application No. 62/776,610, filed on Dec. 7, 2018.

(51) Int. Cl.
| | |
|---|---|
| *B43L 7/00* | (2006.01) |
| *G01B 3/04* | (2006.01) |
| *B26B 29/06* | (2006.01) |
| *B43L 7/02* | (2006.01) |

(52) U.S. Cl.
CPC ............ *B43L 7/005* (2013.01); *B26B 29/06* (2013.01); *B43L 7/02* (2013.01); *G01B 3/04* (2013.01)

(58) Field of Classification Search
None
See application file for complete search history.

(56) References Cited

U.S. PATENT DOCUMENTS

| | | | | | |
|---|---|---|---|---|---|
| 1,497,492 | A | * | 6/1924 | Engel | G06G 1/02 33/494 |
| 2,722,055 | A | * | 11/1955 | Rader | B43L 7/00 33/483 |
| 2,903,795 | A | * | 9/1959 | Wilfert | A41H 3/002 33/2 R |
| 3,491,448 | A | * | 1/1970 | Quinton | B43L 7/005 33/27.01 |
| D257,556 | S | * | 11/1980 | Fulton | B43L 7/005 D10/71 |

(Continued)

FOREIGN PATENT DOCUMENTS

| | | | | | |
|---|---|---|---|---|---|
| CN | 101352855 | A | * | 1/2009 | ............ B26B 29/06 |
| GB | 2282888 | A | * | 4/1995 | ............ G01B 3/004 |

(Continued)

*Primary Examiner* — Christopher W Fulton
(74) *Attorney, Agent, or Firm* — Shane Cortesi

(57) ABSTRACT

A ruler with a slot is described herein. The slotted ruler may include a plurality of widthwise and lengthwise lines that form different sized rectangles and squares located above and below the slot for measuring. The lines may be spaced at fractional metric or imperial intervals. The slotted ruler may further include a plurality of hatch marks. The slotted ruler may further include a set of at least the numbers one, two, three and four spaced 1 centimeter or 1 inch apart located above the slot, an aligned set of numbers located below the slot, as well as an offset set of numbers.

24 Claims, 27 Drawing Sheets

(56) References Cited

U.S. PATENT DOCUMENTS

| | | | | | |
|---|---|---|---|---|---|
| 4,641,436 | A | * | 2/1987 | Tzen | B43L 7/00 33/1 B |
| 4,734,993 | A | * | 4/1988 | Pan | B43L 13/20 33/1 B |
| 6,658,746 | B2 | * | 12/2003 | Ganivet | G01C 21/20 33/1 N |
| 10,429,163 | B2 | * | 10/2019 | Liang | G01B 3/004 |
| 2006/0090360 | A1 | * | 5/2006 | Shapiro | G01B 3/04 33/473 |
| 2008/0098607 | A1 | * | 5/2008 | Minh-Le | B43L 9/007 33/27.02 |
| 2009/0151531 | A1 | * | 6/2009 | Levin | B26D 1/045 83/565 |
| 2012/0227275 | A1 | * | 9/2012 | Goldrick | G01B 3/04 33/562 |

FOREIGN PATENT DOCUMENTS

| | | | | | |
|---|---|---|---|---|---|
| GB | 2463746 | A | * | 3/2010 | B43L 7/005 |
| KR | 20100089954 | A | * | 8/2010 | |
| KR | 20100112017 | A | * | 10/2010 | |
| KR | 20110058430 | A | * | 6/2011 | |

* cited by examiner

SLOTTED RULER

RELATED APPLICATIONS

The present application claims priority to U.S. Provisional Application No. 62/776,610, filed Dec. 7, 2018, the contents of which are incorporated herein by reference in their entirety.

TECHNICAL FIELD

The present invention relates to devices for paper crafting.

BACKGROUND OF THE INVENTION

Rulers including slots are known in the art. However, such rulers typically are used for tailoring clothing and do not include a scheme of different measuring indicia that are useful in creating skillfully-crafted greeting cards, scrapbooking and other crafting projects.

BRIEF SUMMARY

The present disclosure provides a slotted ruler as described herein. In some embodiments, the slotted ruler has a ruler left end, a ruler right end, a ruler length extending from the ruler left end to the ruler right end, a ruler top, a ruler bottom, a ruler width extending from the ruler top to the ruler bottom and generally perpendicular to the ruler length, a ruler rear surface configured to rest on a substrate, a ruler front surface opposite the ruler rear surface, a ruler thickness extending from the ruler front surface to the ruler rear surface and generally perpendicular to the ruler length and ruler width, a straight longitudinal slot having a slot left end that may be located to the right of the ruler left end, a slot right end that may be located to the left of the ruler right end, a slot length extending from the slot left end to the slot right end and parallel to the ruler length. The longitudinal slot may have a slot top, a slot bottom, a slot width extending from the slot top to the slot bottom generally parallel to the ruler width and a slot thickness extending from the ruler front surface to the ruler rear surface. The slotted ruler may be comprised of a transparent or translucent material. The slot width may be between about 0.001 and about 1.0 inches. The slot length and ruler length may be between about 4 inches and about 25 inches. The slot length may be less than the ruler length. The slotted ruler may comprise two sets of widthwise hatch marks extending generally parallel to the ruler width, adjacent to the ruler top and ruler bottom, and spaced at regular intervals along the ruler length and a first set of regularly ordered numerical indicia spaced at regular intervals along the ruler length. The ruler may comprise a first set of lengthwise lines located above the slot and extending generally parallel to the ruler length, and a second set of lengthwise lines located below the slot and extending generally parallel to the ruler length. The lengthwise lines of the first set of lengthwise lines may be equally spaced apart at regular inch or regular centimeter intervals. The lengthwise lines of the second set of lengthwise lines may be equally spaced apart at regular inch or regular centimeter intervals. The distance between the lengthwise lines of the first set of lengthwise lines may be different than the distance between the lengthwise lines of the second set of lengthwise lines. For example, the distance between the lengthwise lines of the first set of lengthwise lines may be at least double (2x) or alternatively less than one half of the distance between the lengthwise lines of the second set of lengthwise lines.

The slot width comprises a center, and optionally the slotted ruler further comprises a center lengthwise line located at the slot width center and extending generally parallel to the ruler length. Optionally, the distance between the center lengthwise line and the lengthwise line of the first set of lengthwise lines nearest to the center lengthwise line is equal to the distance between the lengthwise lines of the first set of lengthwise lines. Optionally, the distance between the center lengthwise line and the lengthwise line of the second set of lengthwise lines nearest to the center lengthwise line is equal to the distance between the lengthwise lines of the second set of lengthwise lines.

Optionally, the slotted ruler further comprises two additional sets of widthwise hatch marks extending generally parallel to the ruler width, located above the slot top and slot bottom, and spaced at regular intervals along the ruler length. Optionally, at least some of each of the widthwise hatch marks adjacent to the ruler top, ruler bottom, slot top, and slot bottom are aligned and spaced at fractional inch or fractional centimeter intervals. Optionally, the slotted ruler further comprises a second set of regularly ordered numerical indicia, wherein the first and second set of regularly ordered numerical indicia and are located on opposite sides of the longitudinal slot, aligned with each other and spaced at 1 inch or 1 centimeter intervals. Optionally, the slotted ruler further comprises a third set of numerical indicia spaced at 1 inch or 1 centimeter intervals and offset from the first and second set of numerical indicia. Optionally, the slotted ruler further comprises a first set of widthwise lines generally perpendicular to the ruler length and lengthwise lines generally parallel to the ruler length. Optionally, the first set of widthwise lines and lengthwise lines form at least one lengthwise row and at least ten widthwise columns of adjoining large rectangles located on one side of the longitudinal slot and extending along the ruler length and ruler width. Optionally, the slotted ruler comprises a second set of widthwise lines generally perpendicular to the ruler length and lengthwise lines generally parallel to the ruler length. Optionally, the second set of widthwise lines and lengthwise lines form at least four lengthwise rows and at least twenty widthwise columns of adjoining squares located on an opposite side of the longitudinal slot, as compared to the adjoining large rectangles, and extending along the ruler length and ruler width. Optionally, the adjoining large rectangles have a width parallel to the ruler width and a length parallel to the ruler length, wherein the adjoining squares have a width parallel to the ruler width and a length parallel to the ruler length. Optionally, the slotted ruler comprises more adjoining squares than adjoining large rectangles. Optionally, the median length of the adjoining large rectangles exceeds the median width of the adjoining squares. Optionally, the median surface area of the adjoining large rectangles is larger than the median surface area of each adjoining square. Optionally, at least some the first and second set of widthwise lines are aligned with some of each of the widthwise hatch marks adjacent to the ruler top and ruler bottom. Optionally, the widthwise lines forming the adjoining large rectangles are aligned with the widthwise lines forming at least some of the adjoining squares. Optionally, the slotted ruler further comprises two additional sets of widthwise hatch marks extending generally parallel to the ruler width, adjacent to the slot top and slot bottom, and spaced at regular intervals along the ruler length. Optionally, at least some of each of the widthwise hatch marks adjacent to the ruler top, ruler bottom, slot top, and slot bottom are aligned and spaced at fractional inch or fractional centimeter intervals. Optionally, at least some of the widthwise hatch marks are aligned with at least some of the widthwise lines forming the adjoining large rectangles and the widthwise lines forming at least some of the adjoining squares. Optionally, the adjoining large rectangles are 0.5 inches in length and 0.25 inches in width. Optionally, the adjoining squares are 0.125 inches in length and 0.125 inches in width. Optionally, the slotted ruler further comprises a third set of widthwise lines generally perpendicular to the ruler length and lengthwise lines generally parallel to the ruler length, the third set of widthwise lines and lengthwise lines forming at least two lengthwise rows and at least ten widthwise columns of adjoining small rectangles spaced between the adjoining large rectangles and the longitudinal slot, wherein the adjoining small rectangles have a width parallel to the ruler width and a length parallel to the ruler length. Optionally, the length of the adjoining small rectangles is equal to the length of the adjoining large rectangles and further wherein the width of the adjoining small rectangles is less than the width of the adjoining large rectangles. Optionally, the slot width is greater at the ruler front surface than at the ruler rear surface. Optionally, the slot top is formed by a slot top wall, wherein the slot bottom is formed by a slot bottom wall, wherein the slot top wall and slot bottom wall slope towards each along a continuous and gradual taper from the ruler front to the ruler rear to form a triangle-shaped slot. Optionally, the widthwise hatch marks are spaced equally along the ruler length at fractional inch or fractional centimeter intervals. Optionally, the slotted ruler further comprises aligned lengthwise hatch marks extending generally parallel to the ruler length located at the ruler left end and the ruler right end, the lengthwise hatch marks spaced equally along the ruler width at fractional inch or fractional centimeter intervals. Optionally, the widthwise hatch marks are spaced equally along the ruler length at at least as frequently as 0.25 inch intervals and further wherein the lengthwise hatch marks are spaced equally along the ruler width at at least as frequently as 0.25 inch intervals. Optionally, the slotted ruler further comprises a first and second set of at least the numbers one, two, three, and four, the numbers in the first and second set appearing in consecutive order and located above and below the longitudinal slot, the numbers above and below the longitudinal slot aligned with each other and spaced at 1 inch or 1 centimeter intervals. Optionally, the slotted ruler further comprises a third set of at least the numbers one, two, three, and four spaced at 1 inch or 1 centimeter intervals and offset from the first and second set of numbers. Optionally, the ruler thickness is between about 0.1 and about 2 inches. Optionally, the slot width is between about 0.001 inches and about 0.1 inches. Optionally, the longitudinal slot is located approximately in the center of the ruler width. Optionally, the widthwise hatch marks located at the slotted ruler top and slotted ruler bottom both utilize the imperial measuring system. Optionally, the widthwise hatch marks located at the slotted ruler top and slotted ruler bottom both utilize the imperial measuring system. Optionally, the ruler rear surface is flat, wherein all markings are on the ruler rear surface, wherein the slotted ruler comprises a tapered front. Optionally, the slotted ruler is in the shape of an isosceles trapezoid. Optionally, the ruler thickness at the longitudinal slot is greater than the ruler thickness at the ruler top end and ruler bottom end. Optionally, the ruler left end, the ruler right end, the ruler top end and the ruler bottom end are straight. Optionally, the slot left end, the slot right end, the slot top and the slot bottom are straight.

In still further embodiments, the present disclosure provides a method of marking a substrate using a slotted ruler and a marking instrument comprising the steps of: placing the longitudinal slot of the slotted ruler over a substrate; placing the marking instrument in the longitudinal slot; and pressing the marking instrument against the substrate and moving the marking instrument along at least a portion of the slot length to mark the substrate in a straight line. Optionally, the marking instrument is selected from the group consisting of a knife and a pencil. Optionally, step a) further comprises placing the substrate over a cutting mat. Optionally, the substrate is a paper-based material. Optionally, the substrate comprises letters, wherein the marking instrument is a knife comprising a blade, and step c) comprises pressing the blade against the substrate adjacent to the letters.

In still further embodiments, the present disclosure provides a method of marking a substrate using a slotted ruler comprising the steps of: placing the slotted ruler over a substrate; placing a marking instrument along the ruler top, ruler bottom, ruler left side or right side; and pressing the marking instrument against the substrate and moving the marking instrument along at least a portion of the ruler top, ruler bottom, ruler left side or right side to mark the substrate in a straight line.

Optionally, the slotted ruler further comprises a first set of widthwise lines generally perpendicular to the ruler length and lengthwise lines generally parallel to the ruler length, the first set of widthwise lines and lengthwise lines forming at least two lengthwise rows and at least ten widthwise columns of adjoining large rectangles located on one side of the longitudinal slot and extending along the ruler length and ruler width. Optionally, the slotted ruler comprises a second set of widthwise lines generally perpendicular to the ruler length and lengthwise lines generally parallel to the ruler length, the second set of widthwise lines and lengthwise lines forming at least four lengthwise rows and at least twenty widthwise columns of adjoining squares located on an opposite side of the longitudinal slot, as compared to the adjoining large rectangles, and extending along the ruler length and ruler width. Optionally, the adjoining large rectangles have a width parallel to the ruler width and a length parallel to the ruler length. Optionally, the adjoining squares have a width parallel to the ruler width and a length parallel to the ruler length. Optionally, the slotted ruler comprises more adjoining squares than adjoining large rectangles, wherein the median length of the adjoining large rectangles exceeds the median width of the adjoining squares. Optionally, the median surface area of the adjoining large rectangles is larger than the median surface area of each adjoining square. Optionally, at least some the first and second set of widthwise lines are aligned with some of each of the widthwise hatch marks adjacent to the ruler top and ruler bottom. Optionally, the marking instrument is a knife comprising a blade. Optionally, step a) comprises positioning at least some of the adjoining squares over the substrate. Optionally, step b) comprises placing the blade along the ruler top, ruler bottom, ruler left side or right side. Optionally, step c) comprises pressing the blade against the substrate and moving the blade along at least a portion of the ruler top, ruler bottom, ruler left side or right side to cut the substrate in a first straight line. Optionally, the method further comprises, after step c), positioning the blade along a side of the slotted ruler adjacent to the side that the blade was placed against in step b) and moving the blade along at least a portion of the adjacent side to cut the substrate in a second straight line located at a 90 degree angle to the first straight line of step c) to form a triangle-shaped cut-out.

In still further embodiments, the present disclosure provides a method of creasing a substrate using a slotted ruler comprising the steps of: placing a substrate through longitudinal slot of the slotted ruler so that the substrate extends forwardly relative to the ruler front surface and rearwardly relative to the flat ruler rear surface; and folding a portion of the substrate towards the ruler front surface or ruler rear surface to crease the substrate.

In still further embodiments, the present disclosure provides a method of marking a substrate using a slotted ruler and a marking instrument comprising the steps of: placing the longitudinal slot of the slotted ruler over a substrate; placing a marking instrument in the longitudinal slot; and pressing the marking instrument against the substrate and moving the marking instrument along at least a portion of the slot length to mark the substrate in a first straight line.

Optionally, the ruler comprises a longitudinal line parallel to the ruler length and slot length, wherein the method further comprises d) moving the slotted ruler so that the longitudinal line aligns with the first straight line, e) placing a marking instrument in the longitudinal slot and f) pressing the marking instrument against the substrate and moving the marking instrument along at least a portion of the slot length to mark the substrate in a second straight line, wherein the second straight line is parallel to the first straight line.

In still further embodiments, the present disclosure provides a method of marking a substrate using a slotted ruler and a marking instrument comprising the steps of: placing the slotted ruler over a substrate having a widthwise edge and a lengthwise edge, wherein the ruler comprises a longitudinal line parallel to the ruler length and slot length and a widthwise line perpendicular to the longitudinal line; aligning the longitudinal line with the lengthwise edge and the widthwise line with the widthwise edge; placing a marking instrument in the longitudinal slot; pressing the marking instrument against the substrate and moving the marking instrument along at least a portion of the longitudinal slot length to mark the substrate in a straight line.

In still further embodiments, the present disclosure provides a method of marking a substrate using a slotted ruler and a marking instrument comprising the steps of: placing the slotted ruler over a substrate having a widthwise edge and a lengthwise edge, wherein the ruler comprises first widthwise line perpendicular to the ruler length and slot length and a second widthwise line parallel to, and spaced apart from, the first widthwise line; aligning the longitudinal line with the lengthwise edge and the widthwise line with the widthwise edge; placing a marking instrument in the longitudinal slot so the marking instrument is located at the first widthwise line; and pressing the marking instrument against the substrate and moving the marking instrument from the first widthwise line to the second widthwise line so as to mark the substrate in a straight line.

BRIEF DESCRIPTION OF THE DRAWINGS

as shown in FIG. 23, the first and second straight lines have formed a triangle cut-out/flag.

DETAILED DESCRIPTION

Figure 1:
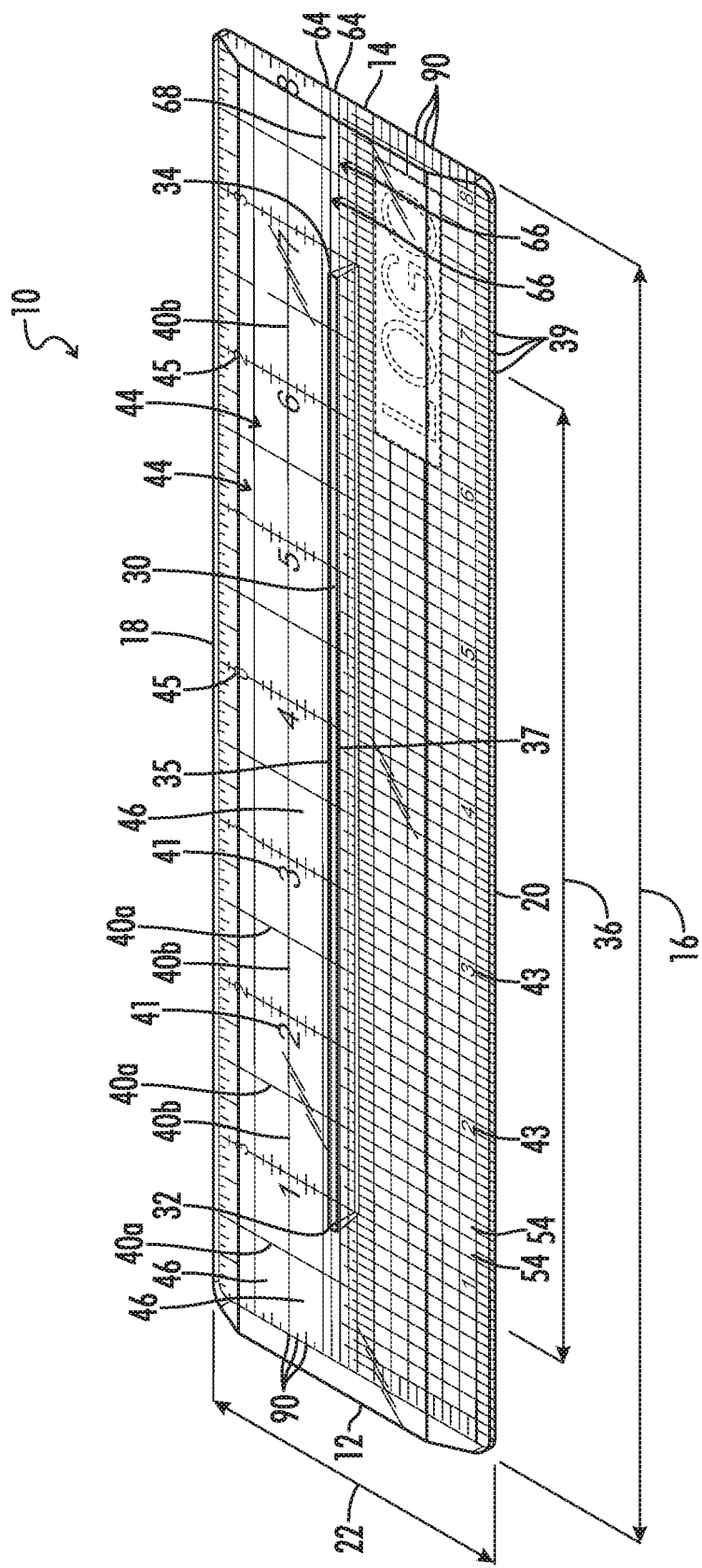
FIG. 1 illustrates a bottom perspective view of a slotted ruler of one embodiment of the present invention in which the measuring intervals are in inches and fractions of inches.

With reference to FIGS. 1-28, the present invention provides a slotted ruler generally designated by the numeral 10. In the drawings, not all reference numbers are included in each drawing for the sake of clarity.

Referring further to FIGS. 1-28, the slotted ruler 10 may include a ruler left end 12, a ruler right end 14, a ruler length 16 extending from the ruler left end 12 to the ruler right end 14, a ruler top 18, a ruler bottom 20, a ruler width 22 extending from the ruler top 18 to the ruler bottom 20 and generally perpendicular to the ruler length 16, a ruler rear surface 23 configured to rest on a substrate 24, a ruler front surface 26 opposite the ruler rear surface 23, a ruler thickness 28 extending from the ruler front surface 26 to the ruler rear surface 23 and generally perpendicular to the ruler length 16 and ruler width 22, a straight longitudinal slot 30 having a slot left end 32 located to the right of the ruler left end 12, a slot right end 34 located to the left of the ruler right end 14, a slot length 36 extending from the slot left end 32 to the slot right end 34 and parallel to the ruler length 16. The longitudinal slot 30 may have a slot top 35, a slot bottom 37, a slot width 38 extending from the slot top 35 to the slot bottom 37 generally parallel to the ruler width 22 and a slot thickness 40 extending from the ruler front surface 26 to the ruler rear surface 23.

The slotted ruler 10, with the exception of the lines, hatch marks, indicia and other markings noted below, may be transparent or translucent. The slotted ruler 10 is preferably comprised of a transparent or translucent material such as acrylic. Optionally, the slot width 38 is between about 0.001 and about 1.0 inches (more preferably, between about 0.001 inches and about 0.1 inches to allow for precision cutting with a thin knife blade). Optionally, the slot length 36 and ruler length 16 are between about 4 inches and about 25 inches. Optionally, the slot length 36 is less than the ruler length 16 (e.g., 2 cm to 4 inches less than the ruler length 16). Optionally, the slotted ruler 10 further comprises two sets of widthwise hatch marks 39 extending generally parallel to the ruler width 22, adjacent to the ruler top 18 and ruler bottom 20, and spaced at regular intervals along the ruler length 16 and a first set of regularly ordered numerical indicia 41 spaced at regular intervals along the ruler length 16. In one embodiment, the hatch marks 39, numerical indicia 41 and all other markings described herein are opaque markings etched on the ruler rear surface 23, which is preferably flat. In an exemplary embodiment, the opaque markings are pink but it will be understood that other colors may be used (e.g., green, black or red). By regular intervals, it is meant that the widthwise hatch marks 39 are spaced evenly apart and at regular measuring intervals, e.g., whole or fractional inches or centimeters. Similarly, it is meant that the numerical indicia 41 are spaced evenly apart and at regular measuring intervals. Optionally, the slot left end 32 and the slot right end 34 are at regular measuring intervals denoted by the numerical indicia 41 (e.g., at the 1 and 7 inch marks in FIG. 2).

Optionally, the slotted ruler 10 further comprises two additional sets of widthwise hatch marks 39 extending generally parallel to the ruler width 22, located adjacent to (e.g., directly above) the slot top 35 and adjacent to (e.g., directly below) the slot bottom 37, and spaced at regular intervals along the ruler length 16. Optionally, at least some of each of the widthwise hatch marks 39 adjacent to the ruler top 18, ruler bottom 20, slot top 35, and slot bottom 37 are aligned and spaced at fractional inch or fractional centimeter intervals. For example, in the illustrated embodiment, all of the widthwise hatch marks 39 adjacent to the ruler top 18, ruler bottom 20, slot top 35, and slot bottom 37 are aligned and spaced at fractional inch intervals.

Optionally, the slotted ruler 10 further comprises a second set of regularly ordered numerical indicia 43, and the first and second set of regularly ordered numerical indicia 41 and 43 are located on opposite sides of the longitudinal slot 30, aligned with each other and spaced at 1 inch or 1 centimeter intervals. For example, in the illustrated embodiments, the first and second set of regularly ordered numerical indicia 41 and 43 are the whole numbers 1, 2, 3, 4, 5, 6, 7, and 8 that are spaced apart at 1 inch intervals.

Optionally, the slotted ruler 10 further comprises a third set of regularly ordered numerical indicia 45 spaced at 1 inch or 1 centimeter intervals and offset from the first and second set of regularly ordered numerical indicia 41 and 43. For example, in the illustrated embodiment, the third set of numerical indicia 45 has the number 0 centered in the middle of the ruler length 16 and the numbers 3, 2, and 1 appear in order to the left and right of the number 0. The term "regularly ordered" as used herein encompasses numerical indicia that are all consecutively ordered as in the case of numerical indicia 41 and 43 as well as so-called zero centering as in the case of numerical indicia 45.

Figure 2:
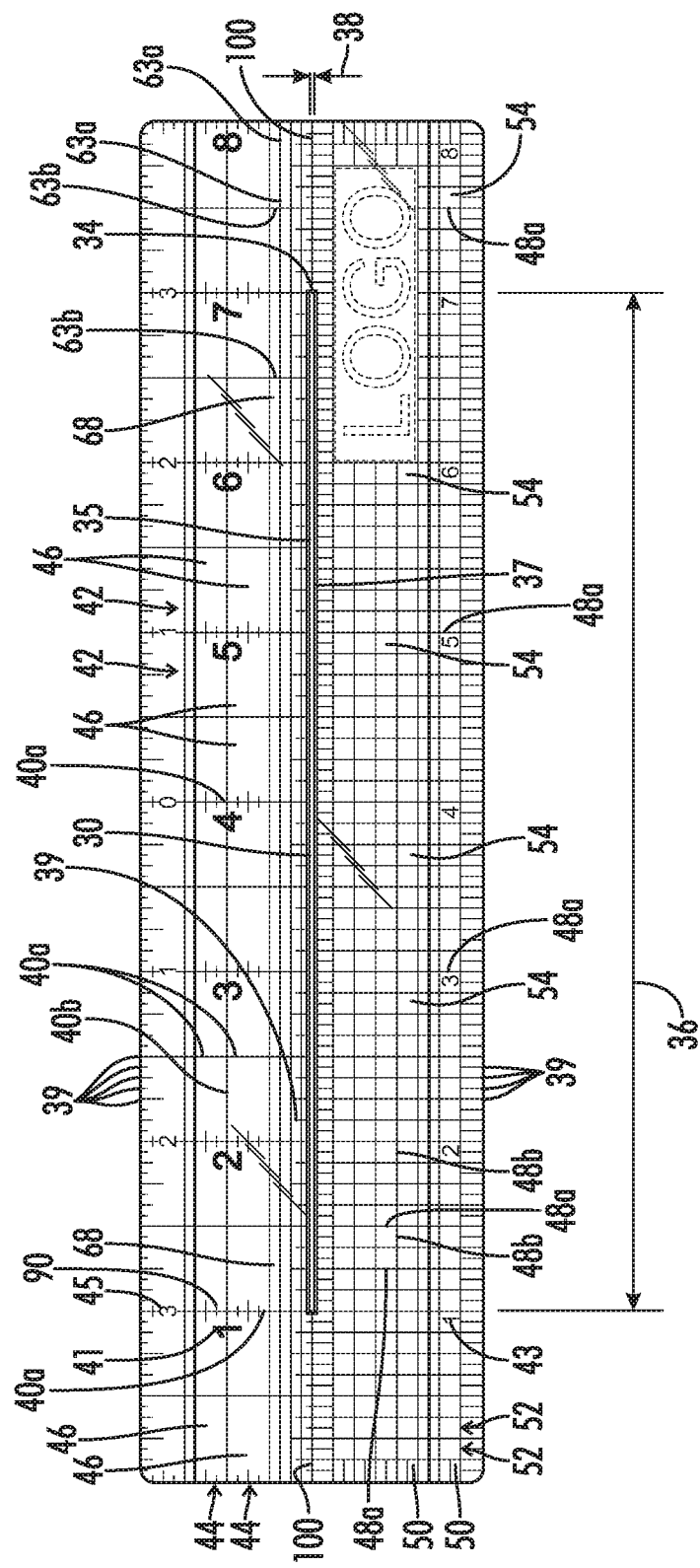
FIG. 2 illustrates a front plan view of the slotted ruler of FIG. 1.

Optionally, the slotted ruler 10 further comprises a first set of a) widthwise lines 40a (which are perpendicular to the ruler length 16) and b) lengthwise lines 40b (which are parallel to the ruler length 16), and the first set of widthwise lines 40a and lengthwise lines 40b form at least one lengthwise row 42 and at least ten widthwise columns 44 of adjoining large rectangles 46 located on one side of the longitudinal slot 30 (e.g, above the longitudinal slot 30) and extending along the ruler length 16 and ruler width 22, and the slotted ruler 10 comprises a second set of widthwise lines 48a (which are perpendicular to the ruler length 16) and lengthwise lines 48b (which are parallel to the ruler length 16), and the second set of widthwise lines 48a and lengthwise lines 48b form at least four lengthwise rows 50 and at least twenty widthwise columns 52 of adjoining squares 54 located on an opposite side of the longitudinal slot 30, as compared to the adjoining large rectangles 46, (e.g, below the longitudinal slot 30) and extending along the ruler length 16 and the ruler width 22 (if there are more than one lengthwise rows 42). Optionally, the adjoining large rectangles 46 have a width 56 parallel to the ruler width 22 and a length 58 parallel to the ruler length 16, and the adjoining squares 54 have a width 60 parallel to the ruler width 22 and a length 62 parallel to the ruler length 16, the slotted ruler 10 comprises more adjoining squares 54 than adjoining large rectangles 46, and optionally the median length 58 of the adjoining large rectangles 46 exceeds the median width 62 of the adjoining squares 54, and optionally the median surface area of the adjoining large rectangles 46 is larger than the median surface area of each adjoining square 54, and optionally at least some (preferably all) the first and second set of widthwise lines 40*a* and 48*a* are aligned with some of each of the widthwise hatch marks 39 adjacent to the ruler top 18 and ruler bottom 20. Optionally the adjoining large rectangles 46 are equally sized, and optionally the adjoining squares 54 are equally sized. Optionally, as shown in FIG. 2 for example, the widthwise lines 40*a* forming the adjoining large rectangles 46 are aligned with the widthwise lines 48*a* forming at least some of the adjoining squares 54. Optionally, as shown in FIG. 2 for example, the slotted ruler 10 further comprises two additional sets of widthwise hatch marks 39 extending generally parallel to the ruler width 22, adjacent to the slot top 35 and slot bottom 37, and spaced at regular intervals along the ruler length 16, optionally at least some of each of the widthwise hatch marks 39 adjacent to the ruler top 18, ruler bottom 20, slot top 35, and slot bottom 37 are aligned and spaced at fractional inch or fractional centimeter intervals, and optionally at least some of the widthwise hatch marks 39 are aligned with at least some of the widthwise lines 40*a* forming the adjoining large rectangles 46 and the widthwise lines 48*a* forming at least some of the adjoining squares 54. Optionally, as shown in FIG. 2 for example, the adjoining large rectangles 46 are 0.5 inches in length and 0.25 inches in width and further wherein the adjoining squares 54 are 0.125 inches in length and 0.125 inches in width. Optionally, the slotted ruler 10 further comprises a third set of widthwise lines 63*a* generally perpendicular to the ruler length 16 and lengthwise lines 63*b* generally parallel to the ruler length 16, the third set of widthwise lines 63*a* and lengthwise lines 63*b* forming at least two lengthwise rows 64 and at least ten widthwise columns 66 of adjoining small rectangles 68 spaced between the adjoining large rectangles 46 and the longitudinal slot 30, wherein the adjoining small rectangles 68 have a width 70 parallel to the ruler width 22 and a length 72 parallel to the ruler length 16, and further wherein the length 70 of the adjoining small rectangles 68 is equal to the length 58 of the adjoining large rectangles 46 and further wherein the width 72 of the adjoining small rectangles 68 is less than the width 56 of the adjoining large rectangles 46. The adjoining small rectangles 68 may have a width 72 of 0.0625 inches for example. In other words, the lengthwise lines 40*b* forming the adjoining large rectangles 46 may be spaced 0.25 inches apart, the lengthwise lines 48*b* forming the adjoining squares 54 may be spaced 0.125 inches apart, whereas the lengthwise lines 63*b* forming the small rectangles 68 may be spaced 0.625 inches apart as previously stated. As a result, the user will be able to utilize more closely spaced lines 63*b* or lines 40*b* and 48*b* that are spaced further apart, depending on the project. In addition, the slotted ruler 10 may comprise a center lengthwise line 100 located at the center of the slot width 38 (see FIGS. 2 and 20) extending generally parallel to the ruler length 16, and the distance 104 between the center lengthwise line 100 and the nearest lengthwise line 63*b* forming the adjoining small rectangles 68 may be 0.625 inches (i.e., the width 72 of the adjoining small rectangles 68) and the distance 102 between the center lengthwise line 100 and the nearest lengthwise line 48*b* forming the adjoining squares 54 may be 0.125 inches (i.e., the width 60 of the adjoining squares 54). (It will be appreciated that the center lengthwise line 100 does not extend through the longitudinal slot 30 itself given that longitudinal slot 30 is an opening/void. See FIGS. 2 and 20).

Each numerical indicia in the first set of regularly ordered numerical indicia 41 is adjacent to a widthwise line (e.g., the first set of widthwise lines 40*a*, as shown in FIG. 2) and denotes a measuring interval (namely, the 1, 2, 3, 4, 5, 6 and 7 inch mark) corresponding to the widthwise line 40*a*. Each numerical indicia in the second set of regularly ordered numerical indicia 43 is adjacent to a widthwise line (e.g., the second set of widthwise lines 48*a*, as shown in FIG. 2) and denotes a measuring interval (namely, the 1, 2, 3, 4, 5, 6 and 7 inch mark) corresponding to the widthwise line 48*a*. Each numerical indicia in the third set of numerical indicia 45 is adjacent to a widthwise hatch mark 39 as shown in FIG. 2.

As shown in FIG. 2, for example, the widthwise lines in the first set of widthwise lines 40*a* that correspond to whole inch intervals include lengthwise hatch marks 90.

Figure 3:
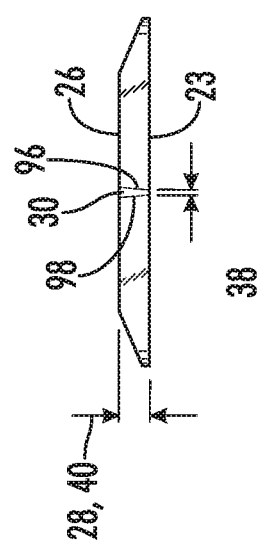
FIG. 3 illustrates a right side elevation view of the slotted ruler of FIG. 1.
Figure 4:
FIG. 4 illustrates a bottom elevation view of the slotted ruler of FIG. 1.
Figure 5:
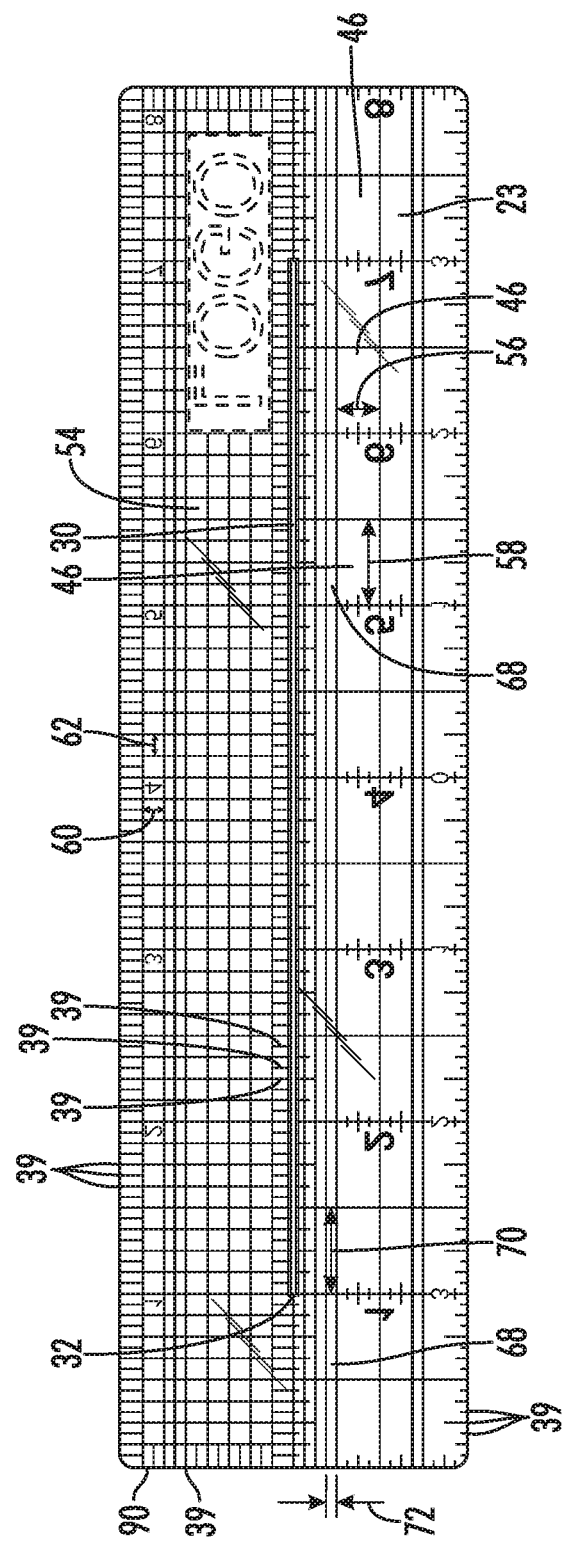
FIG. 5 illustrates a rear plan view of the slotted ruler of FIG. 1.
Figure 6:
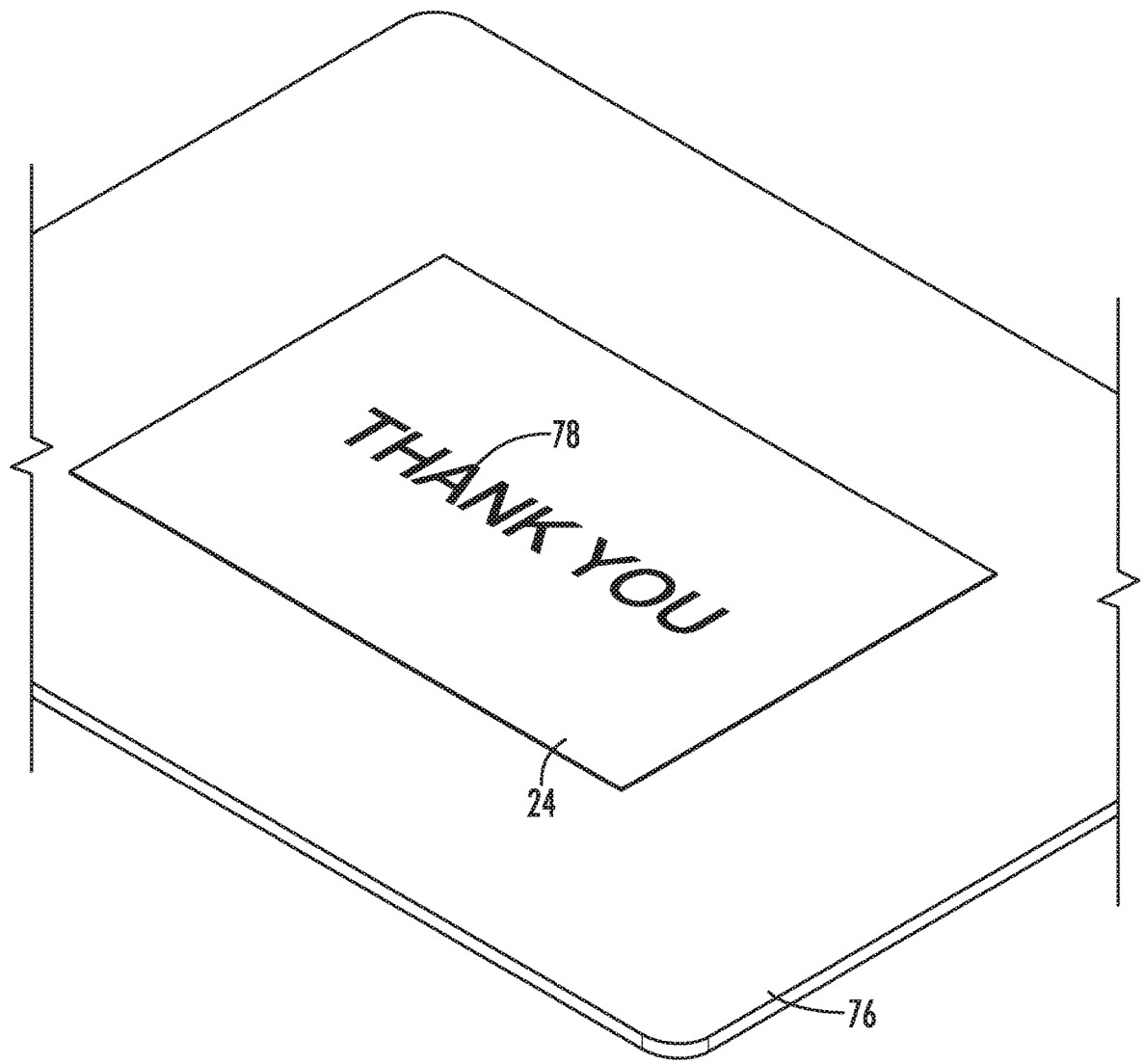
FIG. 6 illustrates a front isometric view of a paper-based substrate located on a cutting mat for use with the slotted ruler of FIG. 1.
Figure 7:
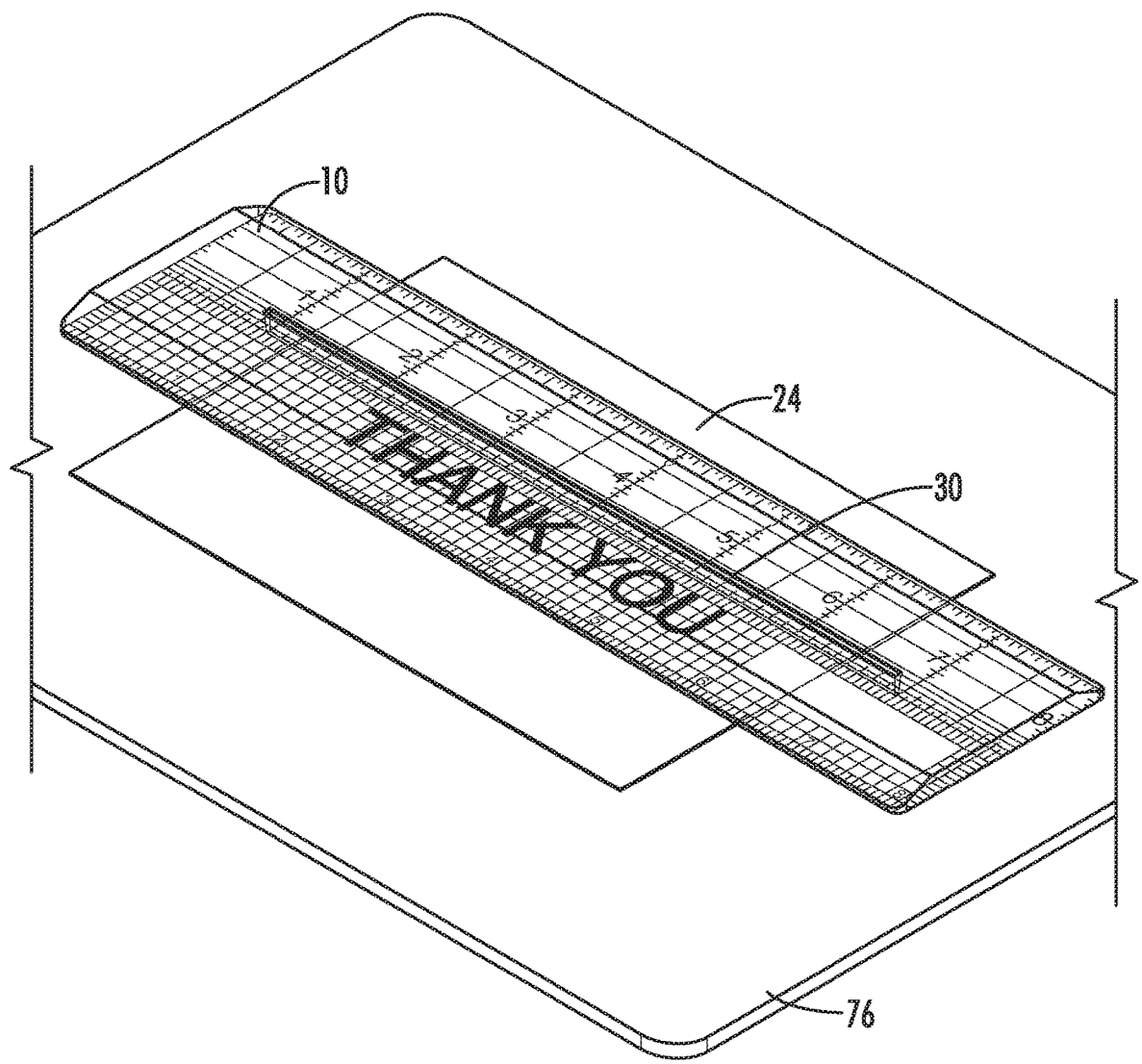
FIG. 7 illustrates a front isometric view of the slotted ruler of FIG. 1 on the paper-based substrate and cutting mat of FIG. 6 before cutting.
Figure 8:
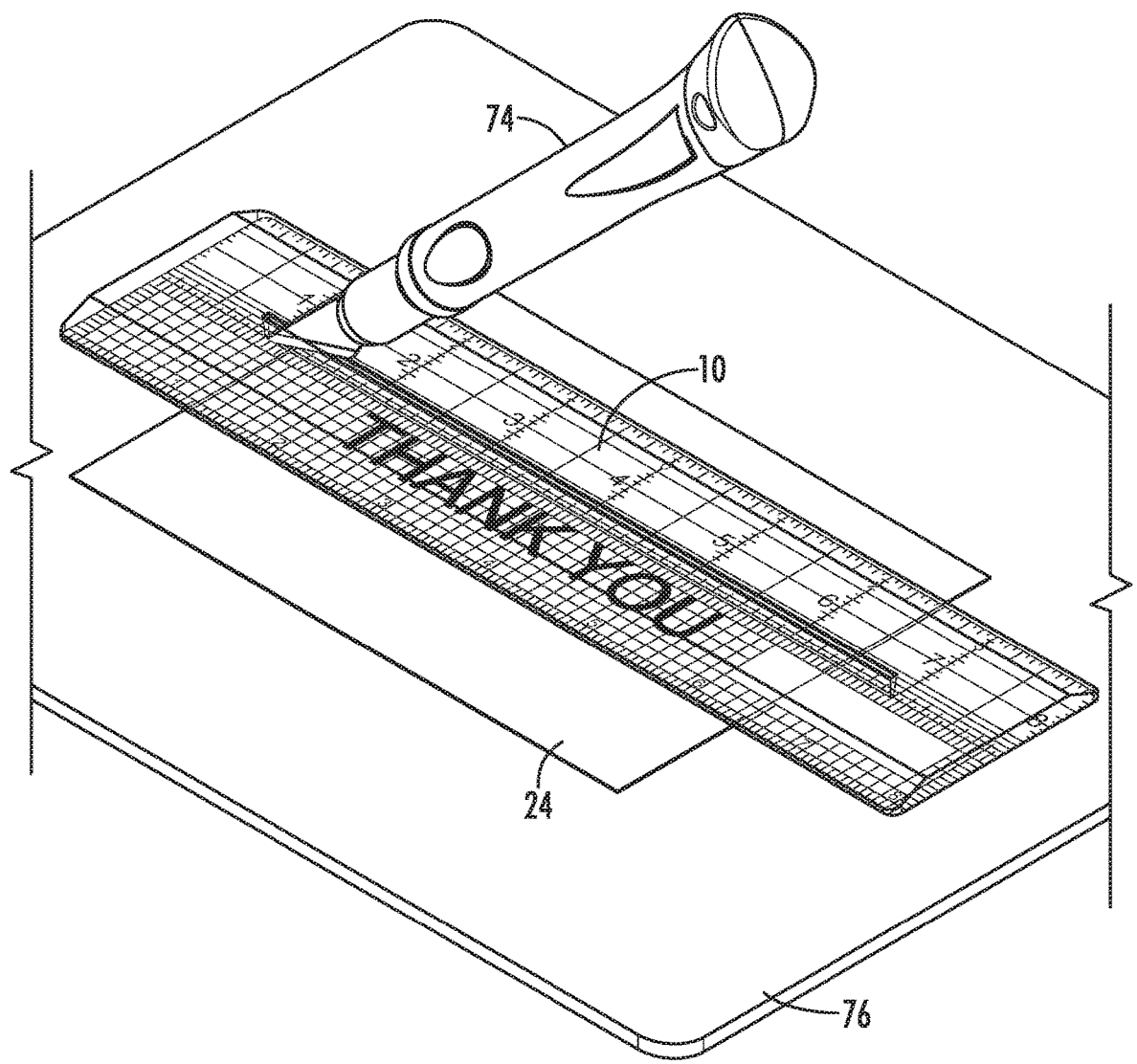
FIG. 8 illustrates a front isometric view of the slotted ruler, paper-based substrate and cutting mat of FIG. 7 with a knife blade placed in the longitudinal slot of the slotted ruler before cutting.
Figure 9:
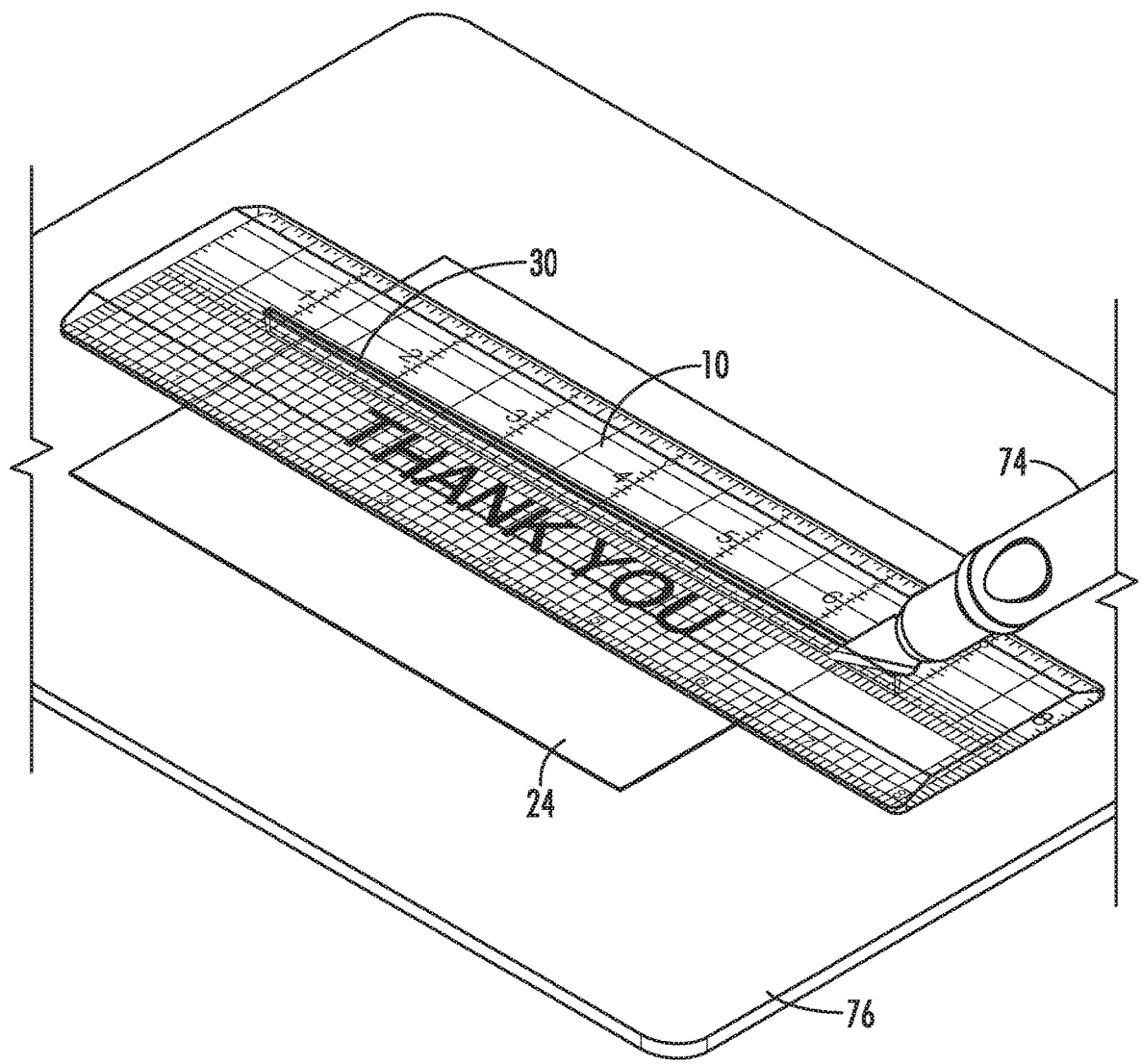
FIG. 9 illustrates a front isometric view of the slotted ruler, paper-based substrate, cutting mat, and knife blade of FIG. 8 after cutting.
Figure 10:
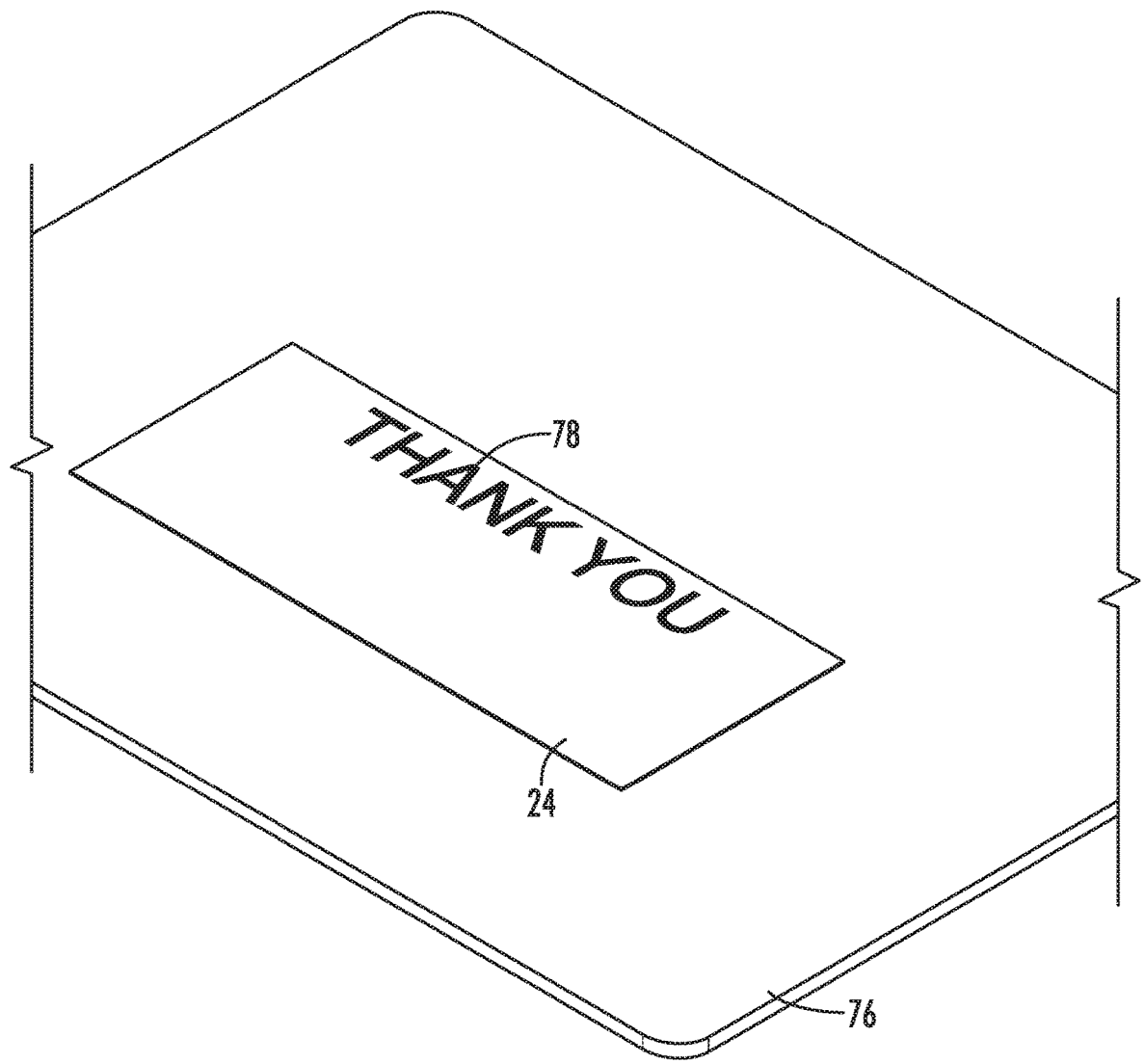
FIG. 10 illustrates a front isometric view of the paper-based substrate and cutting mat of FIG. 9 after cutting.
Figure 11:
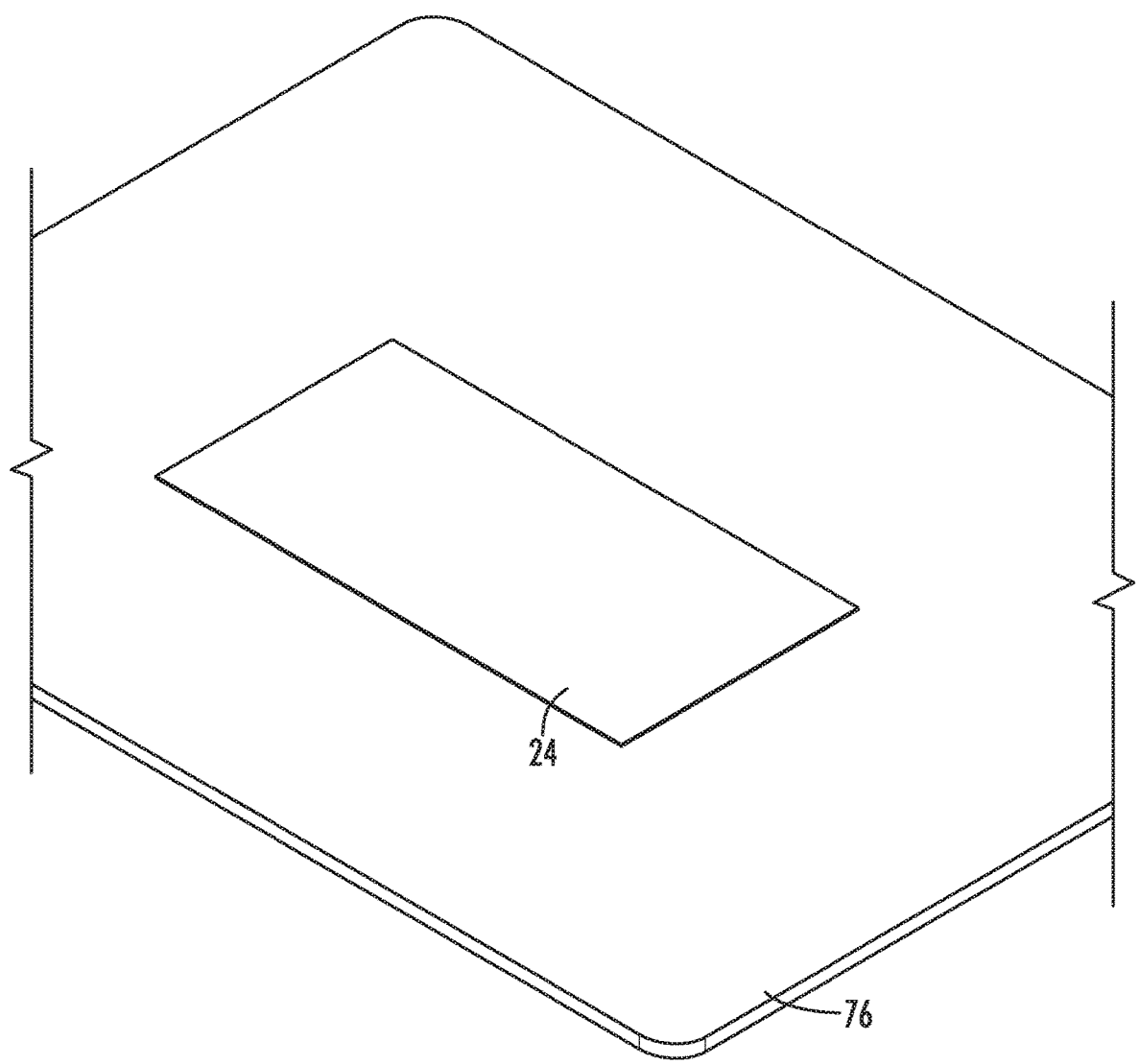
FIG. 11 illustrates a front isometric view of a paper-based substrate located on a cutting mat for use with the slotted ruler of FIG. 1.
Figure 12:
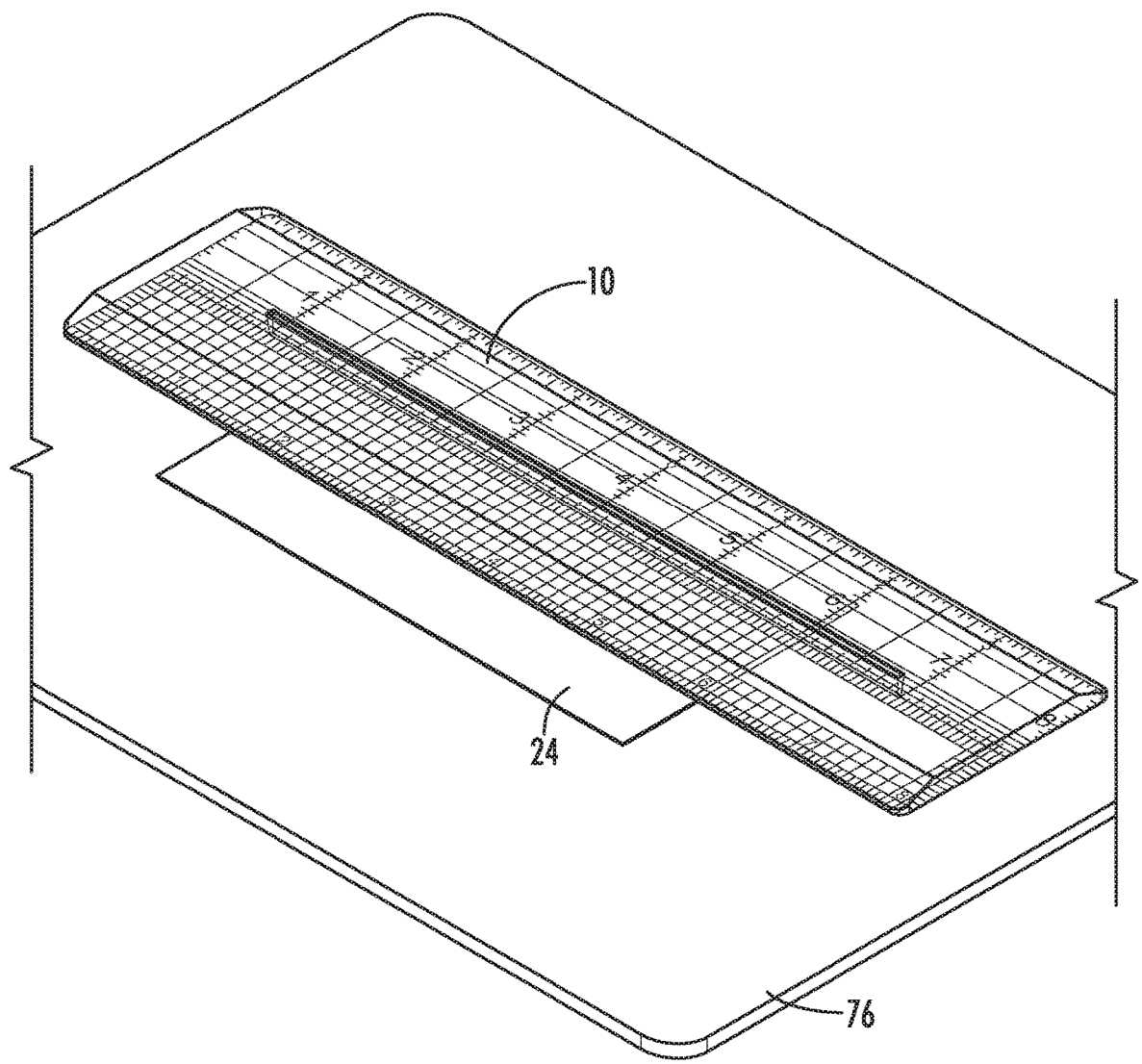
FIG. 12 illustrates a front isometric view of the slotted ruler of FIG. 1 on the paper-based substrate and cutting mat of FIG. 11 before cutting.

Optionally, the slot width 38 is greater at the ruler front surface 26 than at the ruler rear surface 23. For example, as best seen in FIG. 3, the slot top 35 may be formed by a slot top wall 96, the slot bottom 37 may be formed by a slot bottom wall 98, and the slot top wall 96 and slot bottom wall 98 may slope toward each other along a continuous and gradual taper from the ruler front 26 to the ruler rear 23 so that the longitudinal slot 30 is triangular.

Optionally, the widthwise hatch marks 39 are spaced equally along the ruler length 16 at fractional inch or fractional centimeter intervals. Optionally, the slotted ruler 10 further comprises aligned lengthwise hatch marks 90 extending generally parallel to the ruler length 16 located at the ruler left end 12 and the ruler right end 14, the lengthwise hatch marks 90 spaced equally along the ruler width 22 at fractional inch or fractional centimeter intervals.

Optionally, the widthwise hatch marks 39 are spaced equally along the ruler length 16 at at least as frequently as 0.25 inch intervals (i.e., the widthwise hatch marks 39 are spaced no more than 0.25 inches apart) and the lengthwise hatch marks 90 are spaced equally along the ruler width 22 at at least as frequently as 0.25 inch intervals (i.e., the lengthwise hatch marks 90 are spaced no more than 0.25 inches apart).

Optionally, the ruler thickness 28 is between about 0.1 inches and about 2 inches.

Optionally, the longitudinal slot 30 is located approximately in the center of the ruler width 22.

Optionally, the widthwise hatch marks 39 located at the slotted ruler top 18 and slotted ruler bottom 20 both utilize the imperial measuring system. Alternatively, the widthwise hatch marks 39 located at the slotted ruler top 18 and slotted ruler bottom 20 may both utilize the imperial measuring system.

Figure 25:
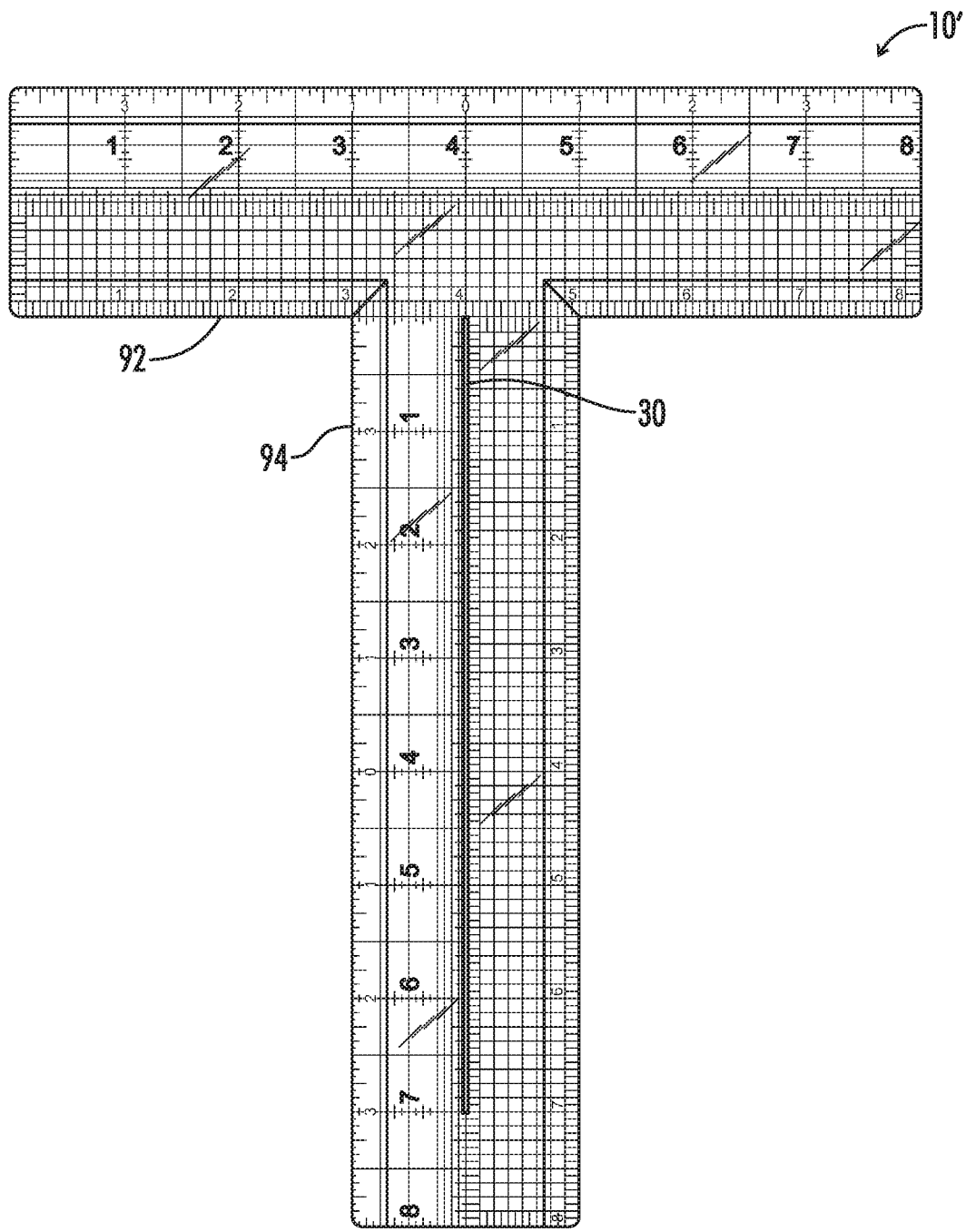
FIG. 25 illustrates a front elevation view of a slotted ruler of another embodiment of the present invention.
Figure 26:
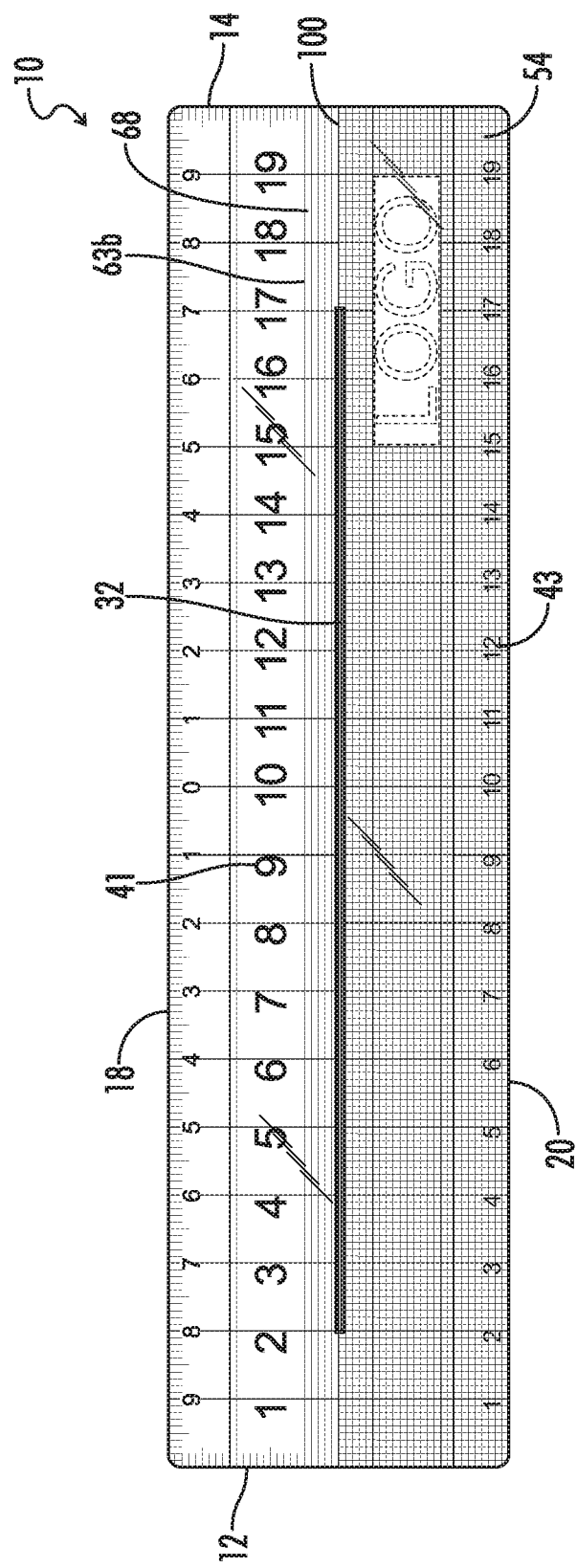
FIG. 26 illustrates a front plan view of a slotted ruler of another embodiment of the present invention in which the measuring intervals are in centimeters and fractions of centimeters.
Figure 27:
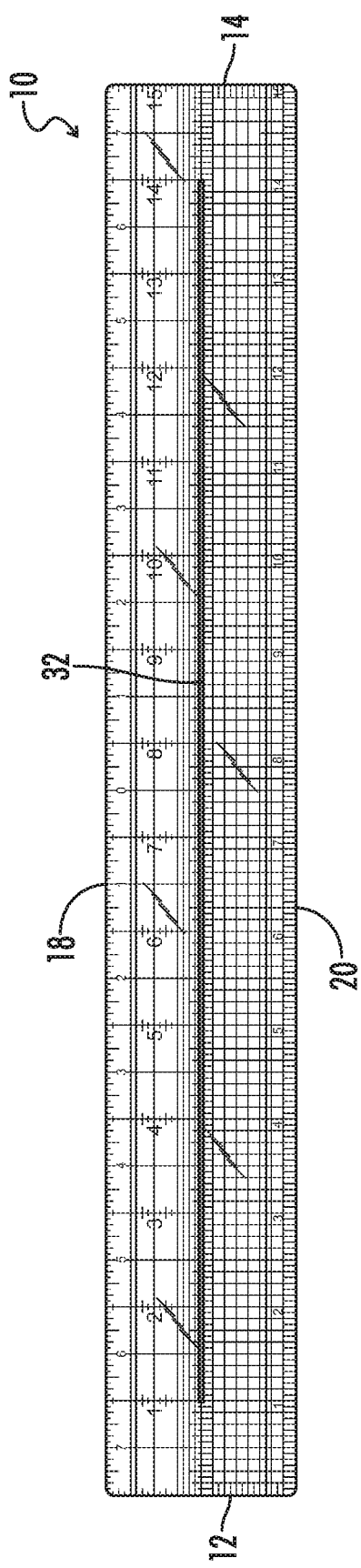
FIG. 27 illustrates a front plan view of a slotted ruler of another embodiment of the present invention in which the measuring intervals are in inches and fractions of inches.
Figure 28:
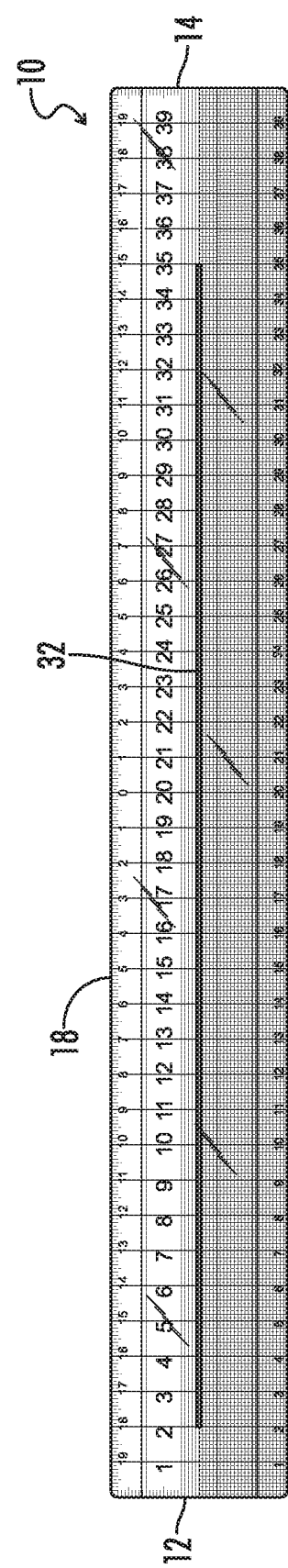
FIG. 28 illustrates a front plan view of a slotted ruler of another embodiment of the present invention in which the measuring intervals are in centimeters and fractions of centimeters.

Optionally, the ruler rear surface 23 is flat, all markings are on the ruler rear surface 23, the slotted ruler 10 comprises a tapered front 26, the slotted ruler 10 is in the shape of an isosceles trapezoid, as best seen in FIG. 3, and the ruler thickness 28 at the longitudinal slot 30 (e.g., in the center of the ruler width 22) is greater than the ruler thickness 28 at the ruler top end 18 and ruler bottom end 20. Optionally, if the slotted ruler 10 is T-shaped as shown in FIG. 25, a portion of the slotted ruler 10 may be in the shape of an isosceles trapezoid. In some embodiments, all markings on the slotted ruler 10 are in fractional (or whole) inch intervals, meaning that adjacent lines or hatch marks of a respective set are spaced at fractional inch intervals, as shown in FIGS. 1-25 and 27. In other embodiments, all markings on the slotted ruler 10 are in fractional (or whole) centimeter intervals, meaning that adjacent lines or hatch marks of a respective set are spaced at fractional centimeter intervals, as shown in FIGS. 26 and 28. Alternatively, the markings may be in a mixture of metric and imperial intervals. (The term "all markings" refers to widthwise and lengthwise hatch marks 39 and 90, widthwise and lengthwise lines 40a, 40b, 48a, 48b, 63a, and 63b, and numerical indicia 41, 43, and 45).

Optionally, the ruler left end 12, the ruler right end 14, the ruler top end 18 and the ruler bottom end 20 are straight. Optionally, the slot left end 32, the slot right end 34, the slot top 35 and the slot bottom 37 are straight (so that the slot width 38 is uniform). In some embodiments, the slotted ruler 10 is generally rectangular in shape, as shown in FIGS. 1-24. In other embodiments, as shown in FIG. 25, the slotted ruler denoted by 10' in FIG. 25, is T-shaped with a horizontal portion 92 and a vertical portion 94.

The slotted ruler 10 may be used in any suitable method. In some embodiments, the slotted ruler 10 is used with a marking instrument 74, such as a knife with a cutting blade or a pencil, pen or marker. In preferred embodiments, the longitudinal slot 30 is narrow and the marking instrument 74 is a precision knife blade or a mechanical pencil tip. Precision knifes are well-known in the art and include those sold under the trade name X-ACTO.

Exemplary methods of use are described below.

As best seen in the stepwise progression of FIGS. 6-10, the slotted ruler 10 may be used in the following method: a) placing the longitudinal slot 30 of the slotted ruler 10 over a substrate 24, which is optionally on a cutting mat 76; b) placing the marking instrument 74 in the longitudinal slot 30; and c) pressing the marking instrument 74 against the substrate 24 and moving the marking instrument 74 along at least a portion of the slot length 36 to mark the substrate 24 in a straight line 82. If used, the cutting mat 76 may be, for example, a self-healing cutting mat or a glass cutting mat. Optionally, the substrate 24 is a paper-based material, such as cardstock. Optionally, the substrate 24 comprises letters (e.g., in the illustrated embodiment the sentiment "THANK YOU"), the marking instrument 74 is a knife comprising a blade, and step c) comprises pressing the blade against the substrate 24 adjacent to the letters to cut the substrate 24.

Figure 20:
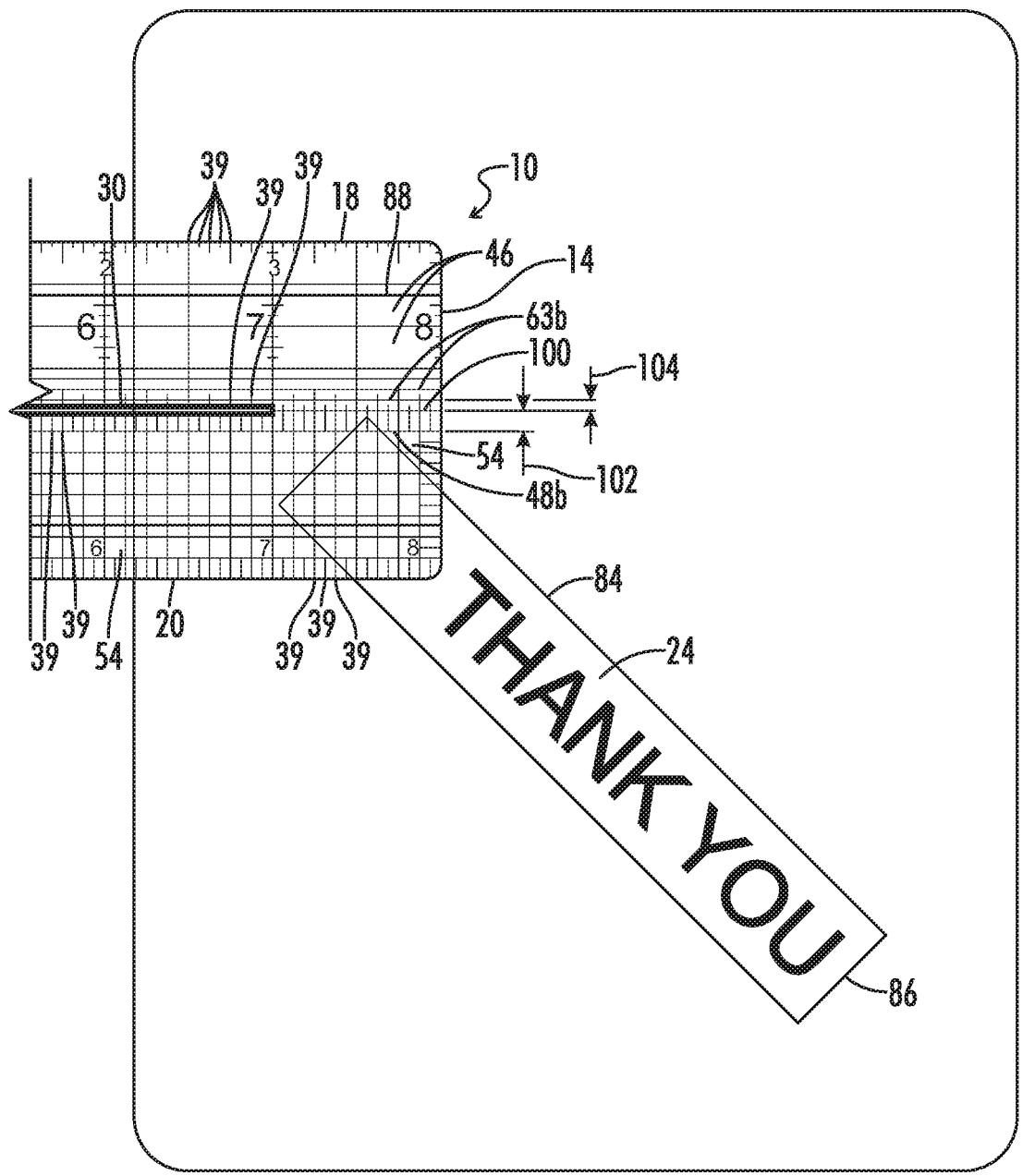
FIG. 20 illustrates a front isometric view of the slotted ruler of FIG. 1 placed over the paper-based substrate of FIG. 19 before cutting.
Figure 21:
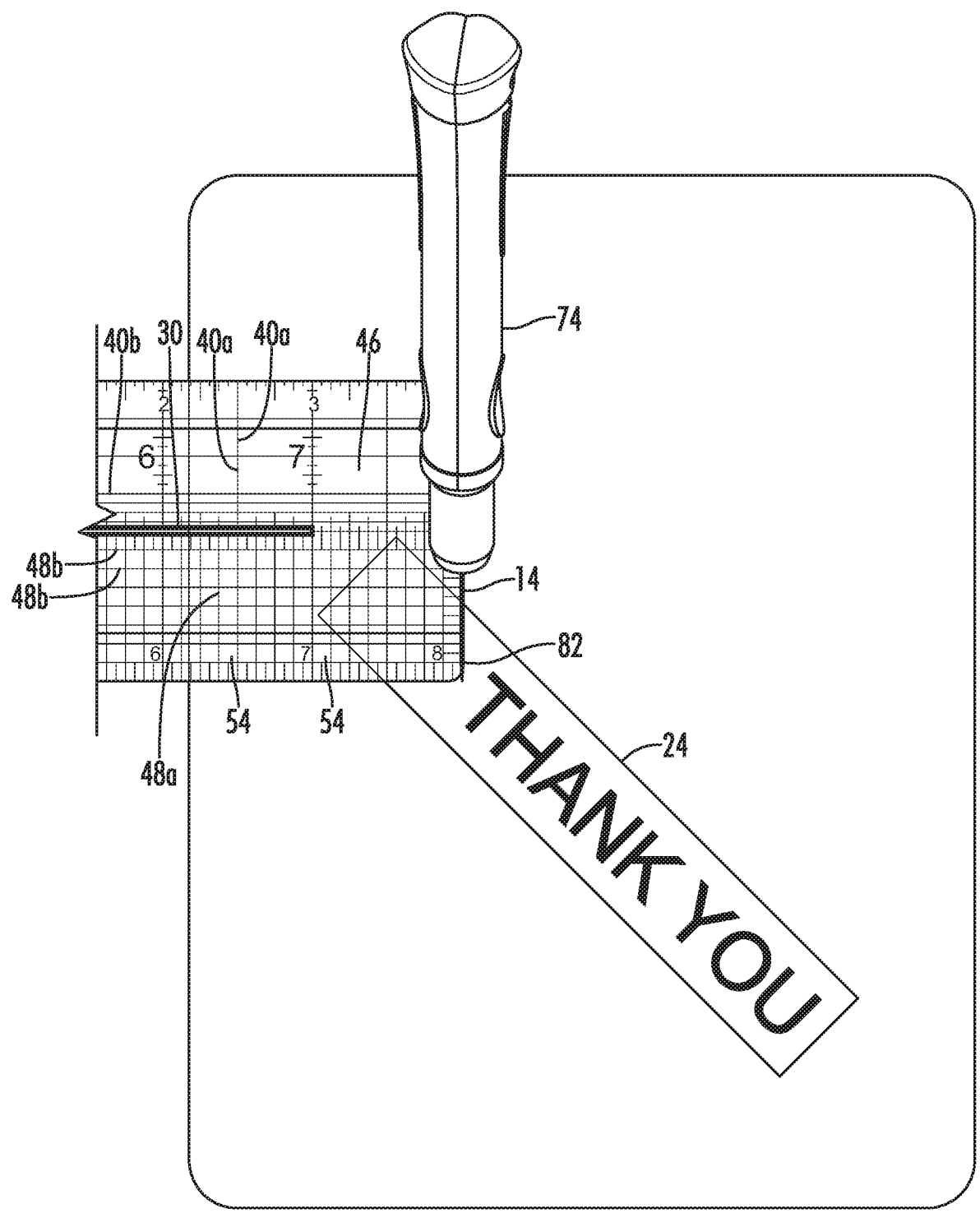
FIG. 21 illustrates a front isometric view of the slotted ruler and the paper-based substrate of FIG. 20 after cutting a first straight line by moving a knife blade along the right side of the slotted ruler.
Figure 22:
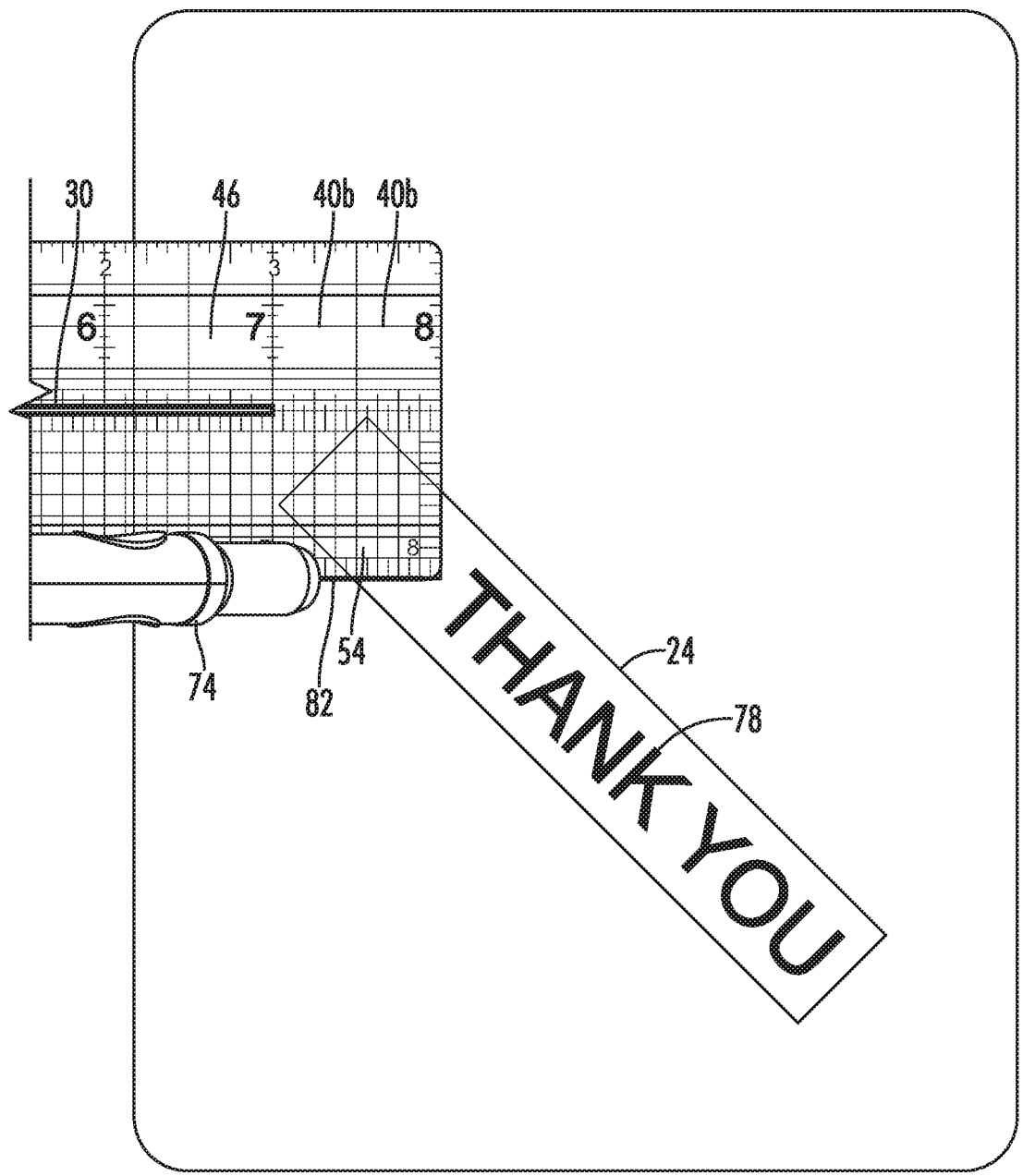
FIG. 22 illustrates a front isometric view of the slotted ruler and the paper-based substrate of FIG. 21 after cutting a second straight line perpendicular to the first straight line by moving a knife blade along the bottom of the slotted ruler.
Figure 23:
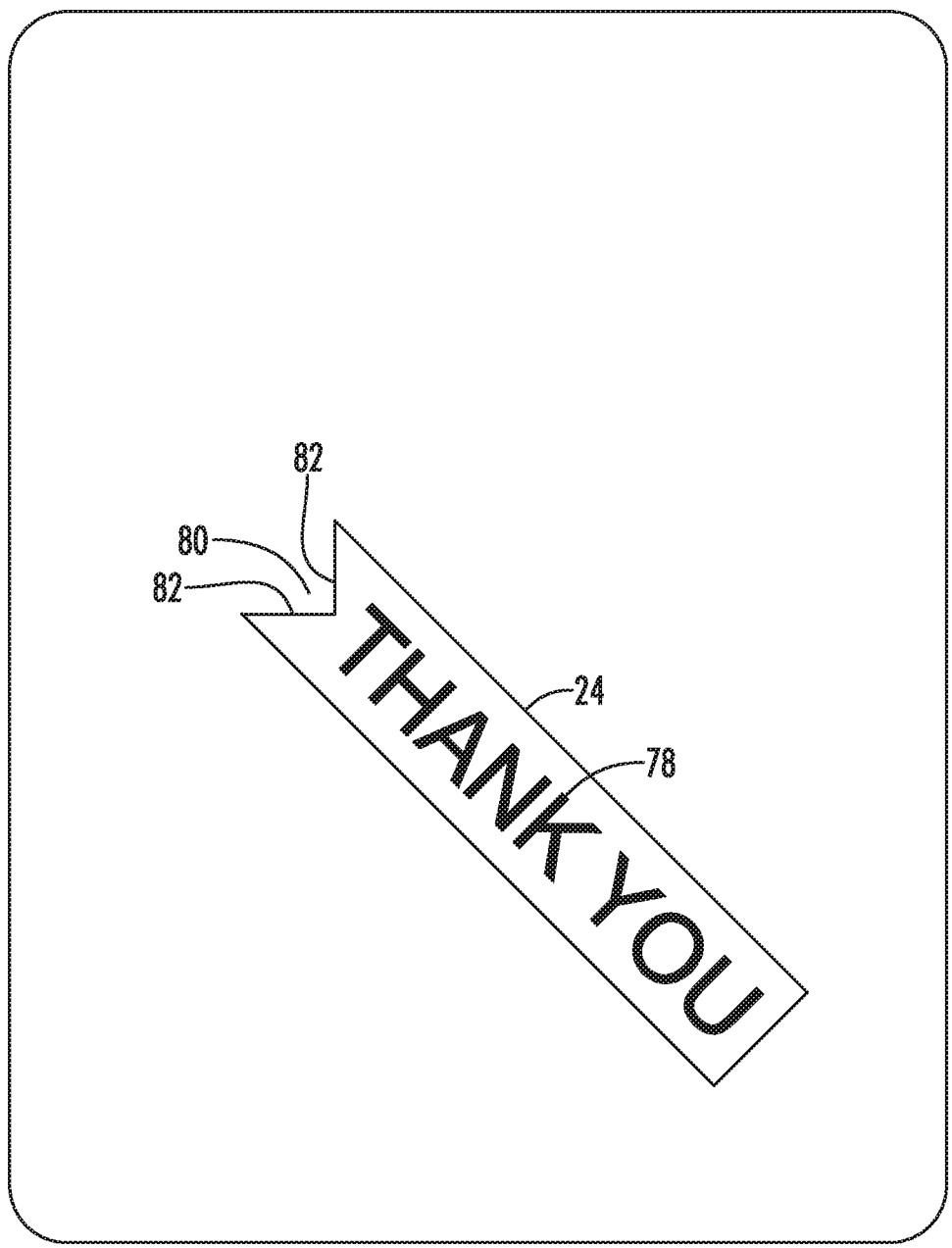
FIG. 23 illustrates a front isometric view of the paper-based substrate of FIG. 22.
Figure 24:
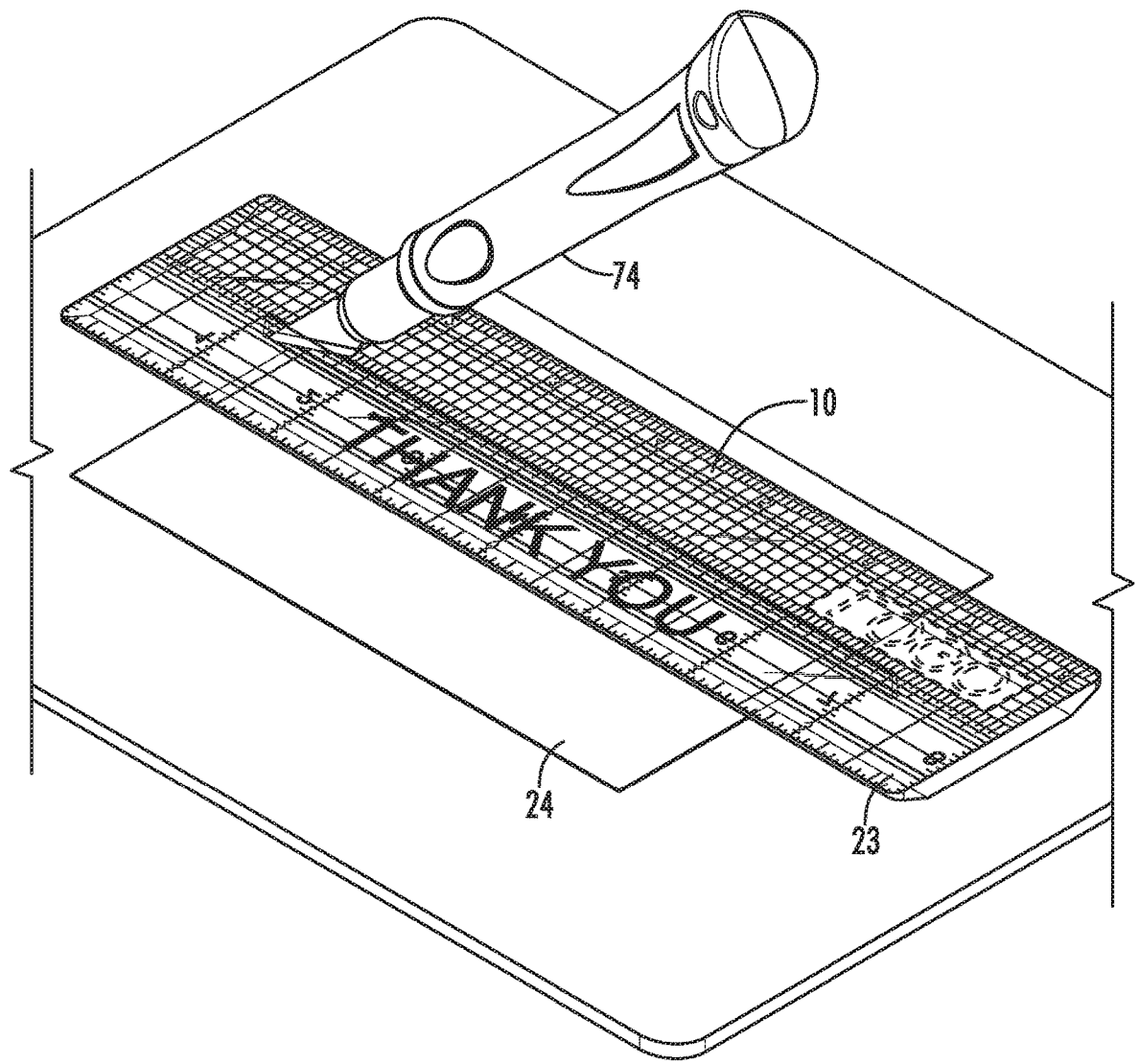
FIG. 24 illustrates a rear isometric view of the slotted ruler of FIG. 1 with a paper-based substrate, cutting mat and a knife blade placed in the longitudinal slot of the slotted ruler before cutting.

As best seen in the stepwise progression shown in FIGS. 20-23, the slotted ruler 10 may be used in the following method: a) placing the slotted ruler 10 over a substrate 24 (which may be again on a cutting mat 76); b) placing a marking instrument 74 along the ruler top 18, ruler bottom 20, ruler left side 12 or right side 14; and c) pressing the marking instrument 74 against the substrate 24 and moving the marking instrument 74 along at least a portion of the ruler top 18, ruler bottom 20, ruler left side 12 or right side 14 to mark the substrate 24 in a straight line 82. Optionally, the marking instrument 74 is a knife comprising a blade, step a) comprises positioning at least some of the adjoining squares 54 over the substrate 24 (as best seen in FIG. 20), step b) comprises placing the blade along the ruler top 18, ruler bottom 20, ruler left side 12 or right side 14, and step c) comprises pressing the blade against the substrate 24 and moving the blade along at least a portion of the ruler top 18, ruler bottom 20, ruler left side 12 or right side 14 to cut the substrate 24 in a first straight line 82 (as best seen in FIG. 21). Optionally, the method further comprises, after step c), positioning the blade along a side of the slotted ruler 10 adjacent to the side that the blade was placed against in step b) and moving the blade along at least a portion of the adjacent side 18, 20, 12 or 14 (as best seen in FIG. 22) to cut the substrate 24 in a second straight line 82 located at a 90 degree angle to the first straight line 82 of step c) to form a triangle-shaped cut-out/flag 80 (as best seen in FIG. 23).

Figure 16:
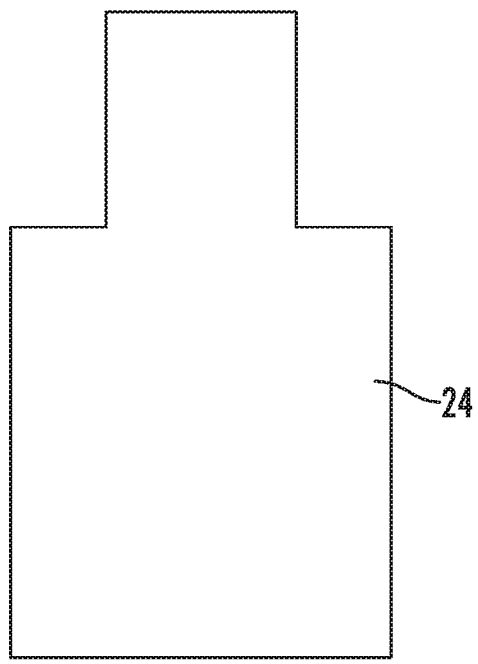
FIG. 16 illustrates a front isometric view of a paper-based substrate for use with the slotted ruler of FIG. 1.
Figure 17:
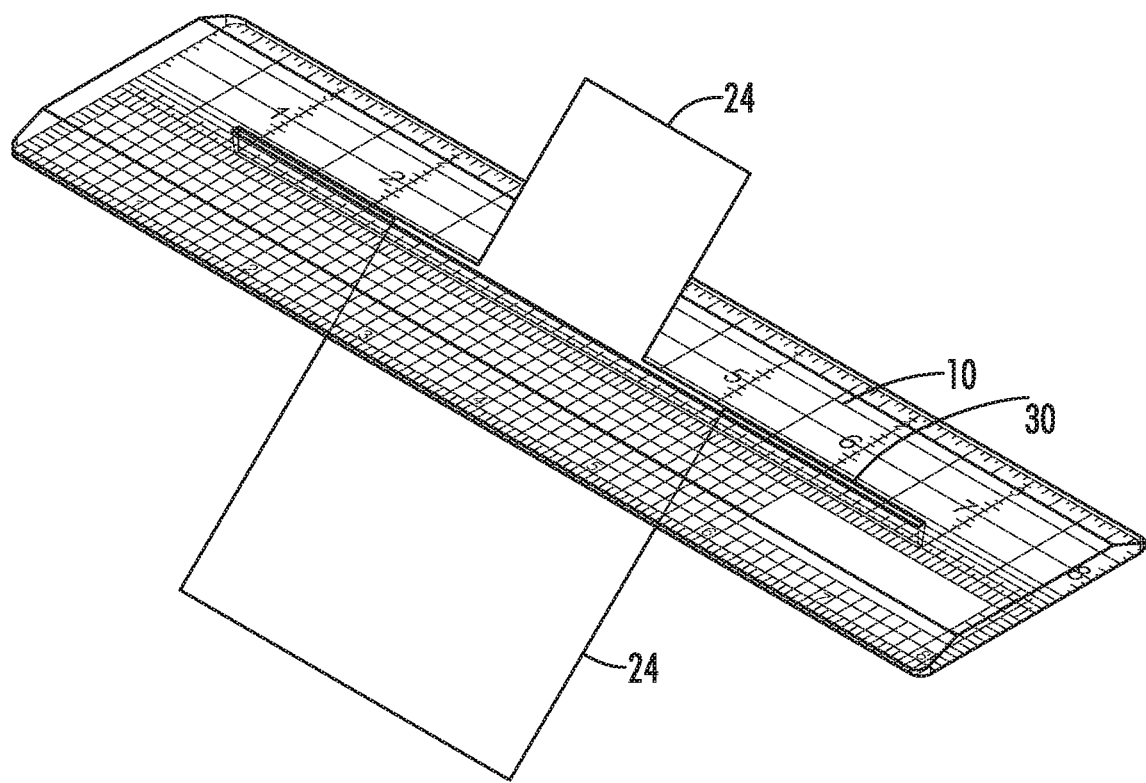
FIG. 17 illustrates a front isometric view of the paper-based substrate of FIG. 16 placed in the longitudinal slot of the slotted ruler of FIG. 1 before folding the paper-based substrate towards the ruler front surface.
Figure 18:
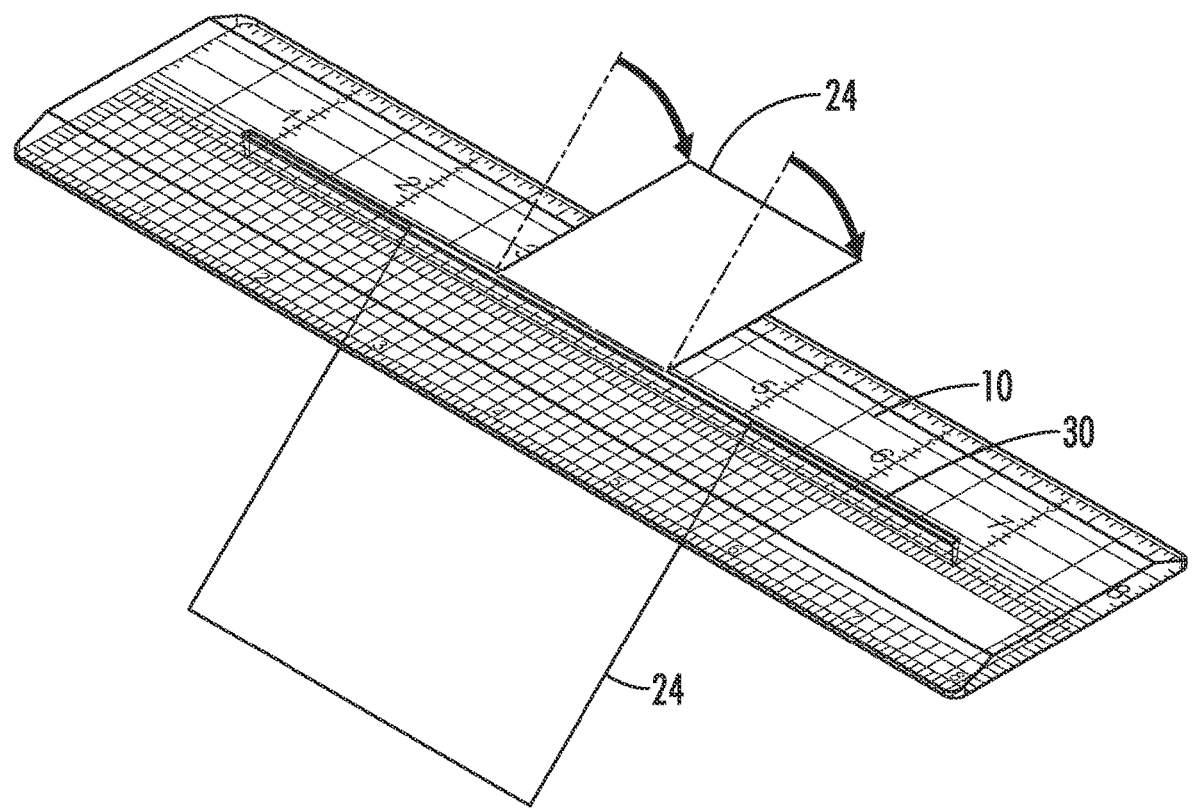
FIG. 18 illustrates a front isometric view of the paper-based substrate of FIG. 17 placed in the longitudinal slot of the slotted ruler of FIG. 1 after folding a portion of the paper-based substrate towards the ruler front surface.
Figure 19:
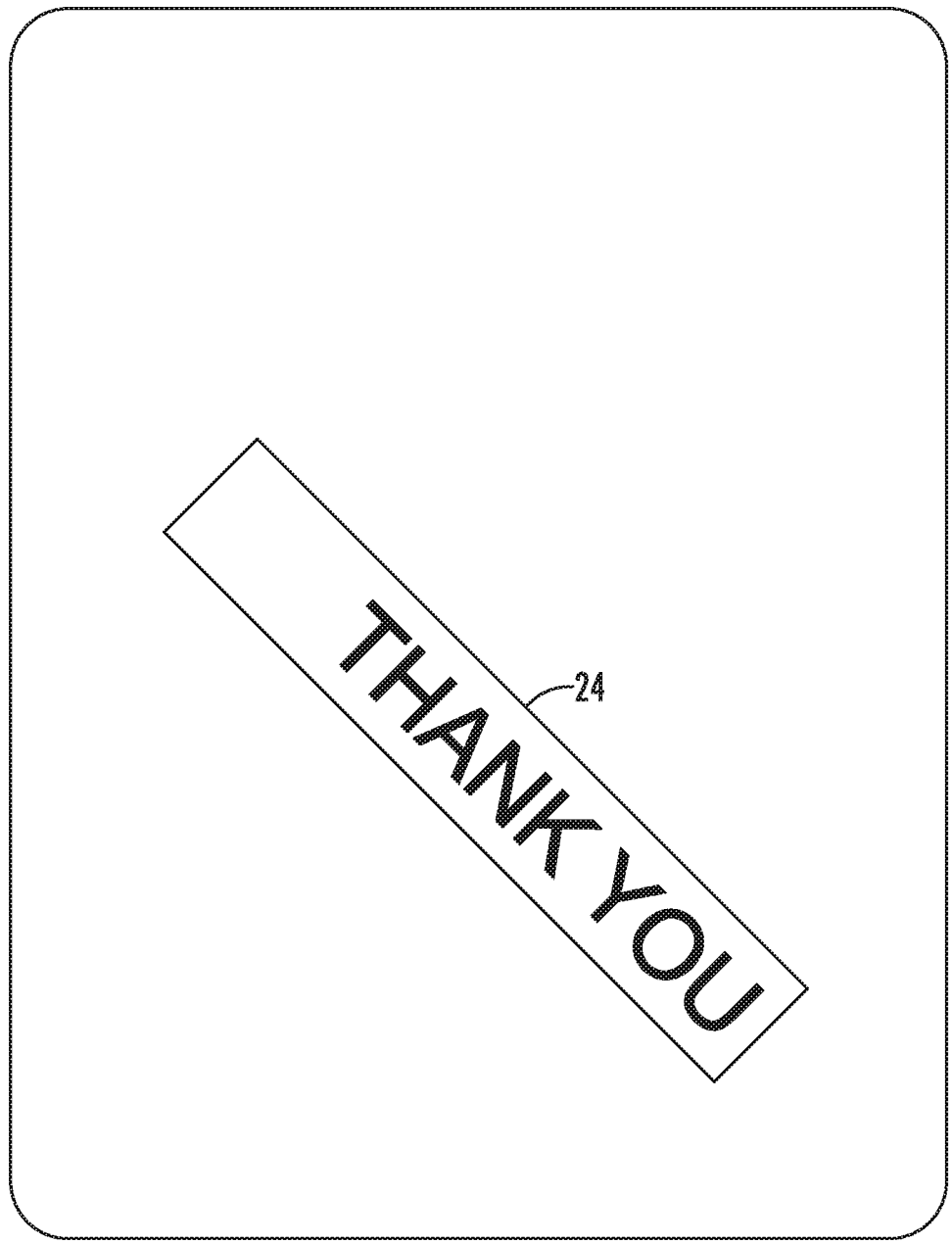
FIG. 19 illustrates a front isometric view of a paper-based substrate for use with the slotted ruler of FIG. 1.

As shown in the stepwise sequence of FIGS. 16-18, the slotted ruler 10 may also be used in a method of creasing a substrate 24 using a slotted ruler 10 comprising the steps of: a) placing a substrate 24 through longitudinal slot 30 of the slotted ruler 10 so that the substrate 24 extends forwardly relative to the ruler front surface 26 and rearwardly relative to the flat ruler rear surface 23 (see FIG. 17); and b) folding a portion of the substrate 24 towards the ruler front surface 26 or ruler rear surface 23 to crease the substrate 24 (see FIG. 18). Optionally, in such methods, the substrate may be pre-creased and the aforementioned may make the crease deeper/more noticeable.

Figure 13:
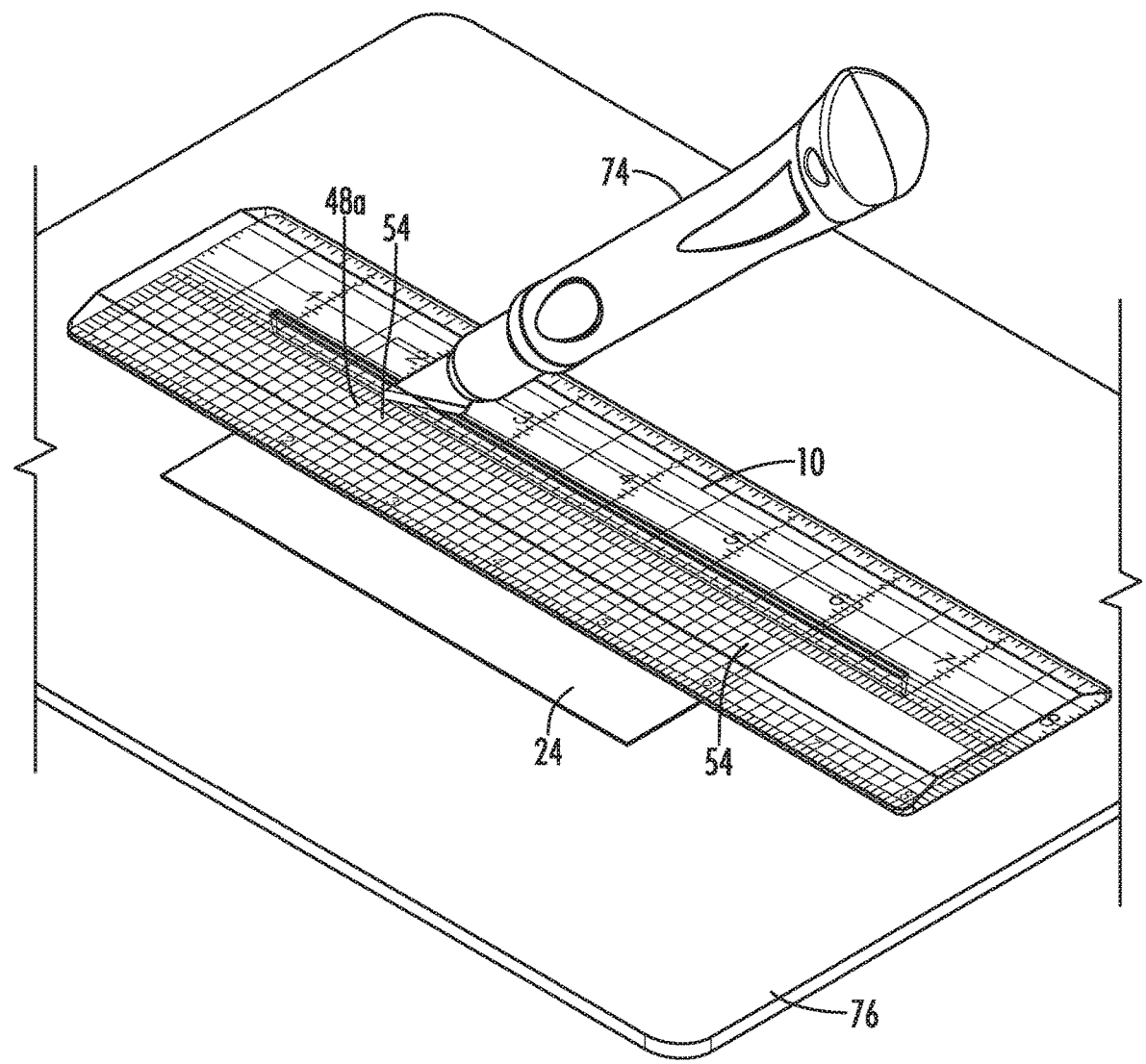
FIG. 13 illustrates a front isometric view of the slotted ruler, paper-based substrate and cutting mat of FIG. 12 with a knife blade placed in the longitudinal slot of the slotted ruler before cutting.
Figure 14A:
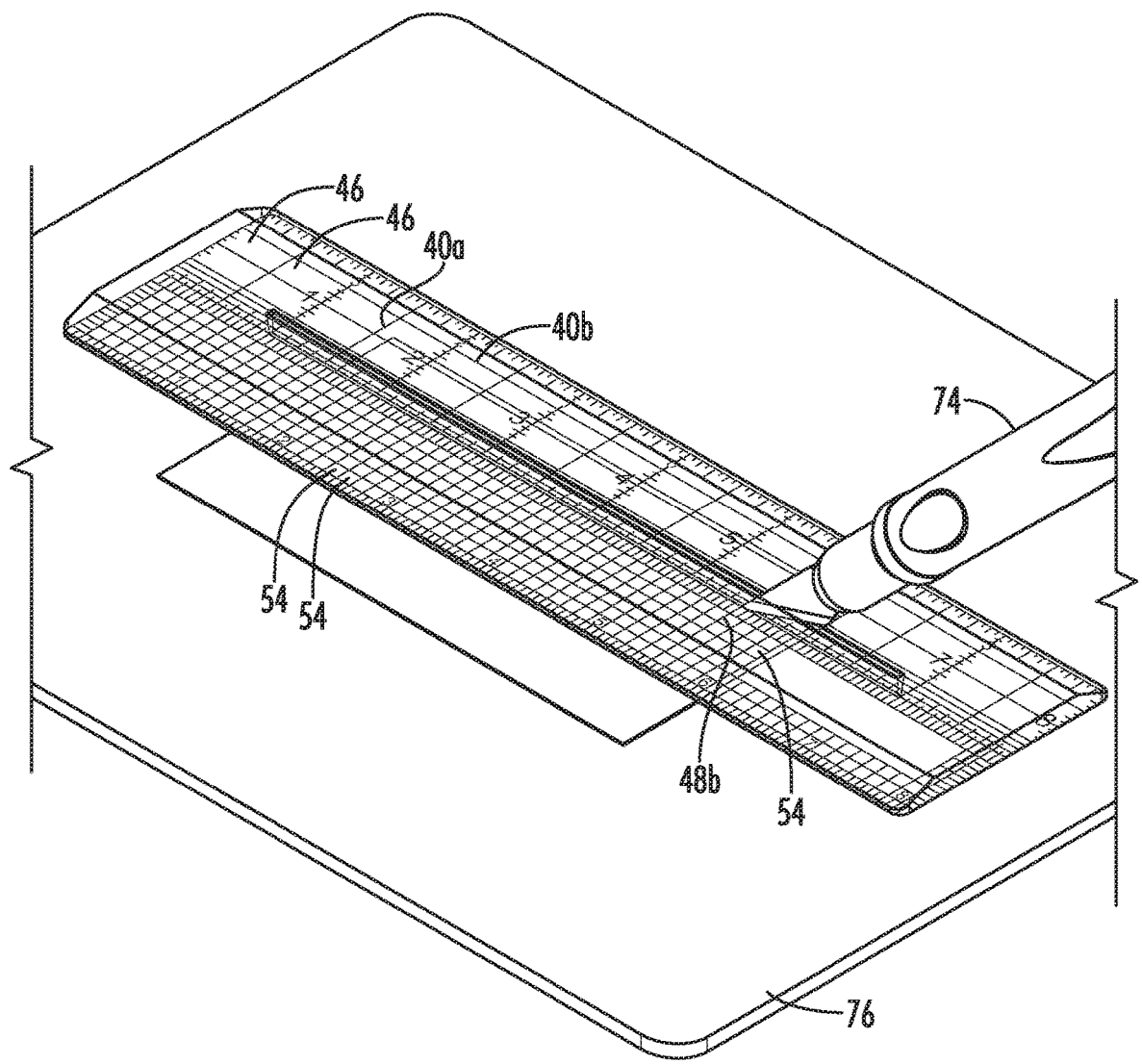
FIG. 14A illustrates a front isometric view of the slotted ruler, paper-based substrate, cutting mat, and knife blade of FIG. 13 after cutting a first straight line.
Figure 14B:
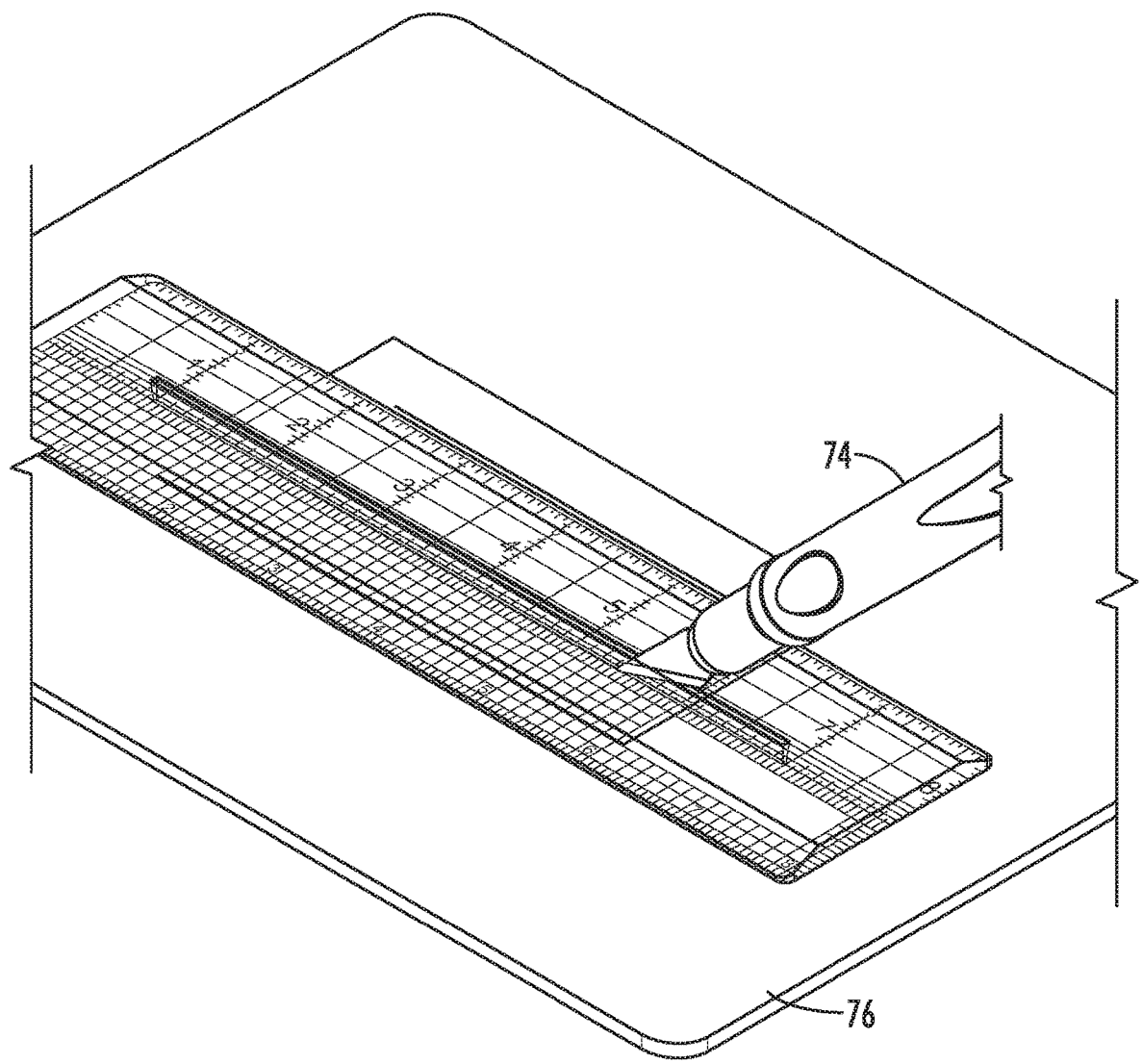
FIG. 14B illustrates a front isometric view of the slotted ruler, paper-based substrate, cutting mat, and knife blade of FIG. 14A after cutting a second straight line parallel to the first straight line.
Figure 15:
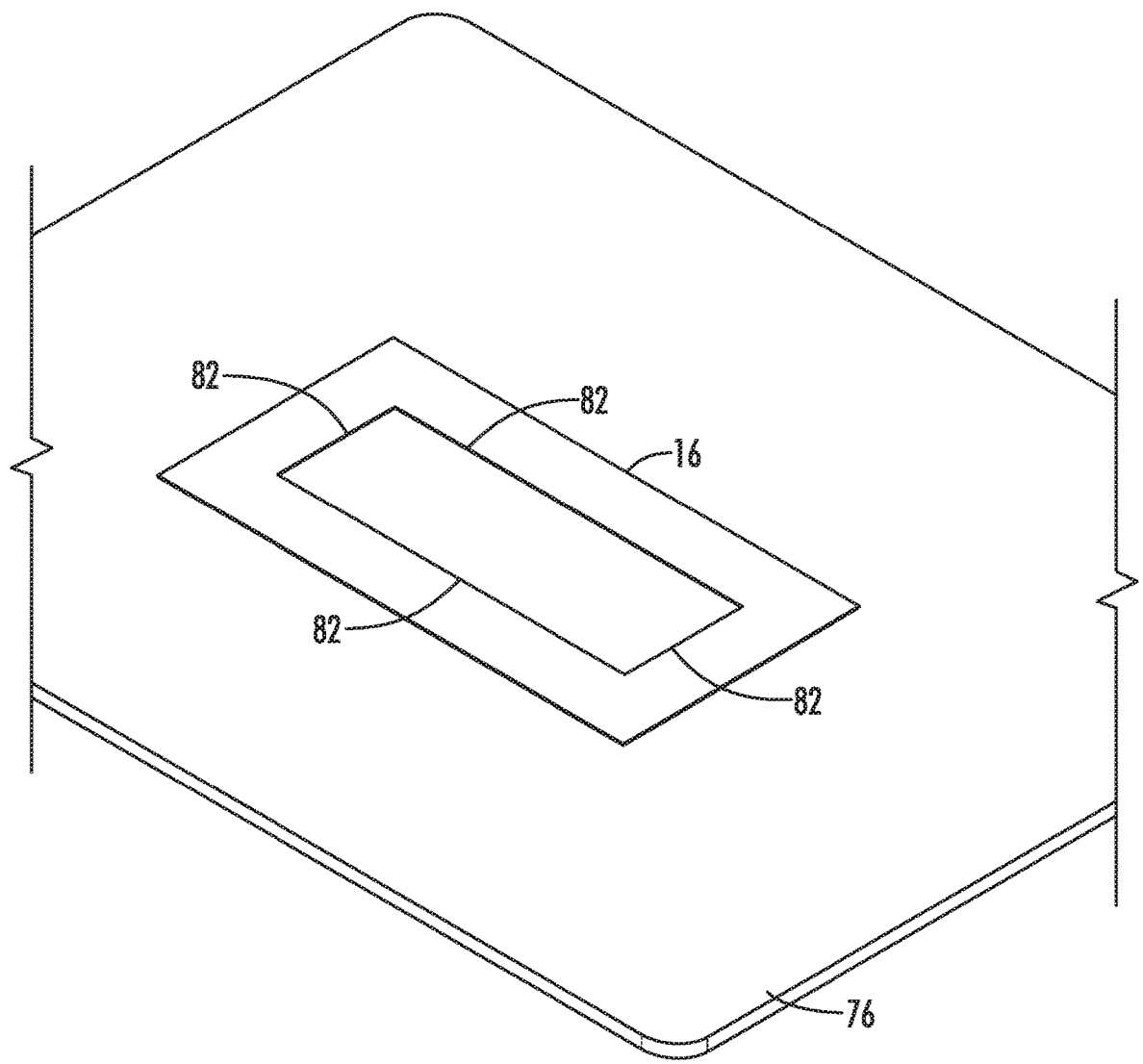
FIG. 15 illustrates a front isometric view of the paper-based substrate, and cutting mat of FIG. 14B after cutting two straight lines generally perpendicular to the first and second straight line.

As shown in the stepwise sequence of FIGS. 13-15, the slotted ruler 10 may also be used in a method of marking a substrate 24 using a slotted ruler 10 and a marking instrument 74 comprising the steps of: a) placing the longitudinal slot 30 of the slotted ruler 10 over a substrate 24; b) placing a marking instrument 74 in the longitudinal slot 30; c) pressing the marking instrument 74 against the substrate 24 and moving the marking instrument 74 along at least a portion of the slot length 36 to mark the substrate 24 in a first straight line 82. Optionally, the method further comprises d) moving the slotted ruler 10 so that a longitudinal line 40b, 48b and/or 63b aligns with the first straight line 82, e) placing a marking instrument 74 in the longitudinal slot 30 and f) pressing the marking instrument 74 against the substrate 24 and moving the marking instrument 74 along at least a portion of the slot length 36 to mark the substrate 24 in a second straight line 82, wherein the second straight line 82 is parallel to the first straight line 82. In the progression of FIGS. 13-15, a user may also rotate the slotted ruler 10, and repeat steps a-f) and to create two lines 82 perpendicular to the first and second straight lines 82 to form the rectangular-shaped cut-out shown in FIG. 15. The adjoining squares 54 may be used in helping alignment. For example, as best seen in FIG. 14A, the user may position the knife blade so that there are three adjoining squares 54 between the knife blade and the top widthwise edge 86 of the substrate 24 and then the user may move the knife blade downwardly until there are three adjoining squares 54 between the knife blade and the bottom widthwise edge 86 of the substrate 24, as shown in FIG. 14B, thereby allowing the cut to be centered in the substrate 24.

It will be appreciated that the slotted ruler 10 provides the user a number of different measuring and alignment aids, in the form of a) lines 40a, 40b, 48a, 48b, 63a and 63b that form shapes 46, 54, and 68, b) hatch marks 39 and 90, and c) numerical indicia 41, 43 and 45 to aid in precision cutting and drawing. The slotted ruler 10 may utilize any combination of the foregoing.

Non-limiting examples of fractional inch intervals, herein, include ½ inch, ¼ inch, ⅛ inch, 1/16 inch and 1/32 inch intervals. Non-limiting examples of fractional centimeter intervals include 0.1 centimeter intervals (e.g., 1 millimeter). It will be appreciated that any markings herein spaced at fractional inch or centimeter intervals may alternatively be spaced whole inch or whole centimeter intervals.

It will also be appreciated that all illustrations herein are to scale and that the distance between any particular markings can be determined by reference to numerical indicia 41 and 43 and the associated hatch marks.

It will also be appreciated that, in the illustrations, line 88 is not a marking but is instead is a false line created by the trapezoidal shape of the illustrated embodiment. It will also be appreciated that the slotted ruler 10 may include a break in the patterns for a logo, as shown in the illustrated embodiments.

PART LIST slotted ruler 10
ruler left end 12
ruler right end 14
ruler length 16
ruler top 18
ruler bottom 20
ruler width 22
ruler rear surface 23
substrate 24
ruler front surface 26
ruler thickness 28
longitudinal slot 30
slot left end 32
slot right end 34
slot top 35
slot length 36
slot bottom 37
slot width 38
widthwise hatch marks 39
slot thickness 40
first set of widthwise lines 40a
first set of lengthwise lines 40b
first set of numerical indicia 41
lengthwise rows for first set 42
second set of numerical indicia 43
widthwise columns for first set 44
third set of numerical indicia 45
adjoining large rectangles 46
second set of widthwise lines 48a
second set of lengthwise lines 48b
lengthwise rows 50
widthwise columns 52
adjoining squares 54
large rectangles width 56
large rectangles length 58
square width 60
square length 62
third set of widthwise lines 63a
third set of lengthwise lines 63b
lengthwise rows for third set 64
lengthwise columns for third set 66
adjoining small rectangles 68
small rectangle length 70
small rectangle width 72
marking instrument 74
cutting mat 76
substrate letters 78
triangle cut-out 80
cut lines 82
substrate lengthwise edge 84
substrate widthwise edge 86
false line created by ruler shape 88
lengthwise hatch marks 90
horizontal portion of t-shaped ruler 92
vertical portion of t-shaped ruler 94
slot top wall 96
slot bottom wall 98
center of longitudinal slot 100
distance between center of longitudinal slot and nearest of second set of lengthwise lines 48b 102
distance between center of longitudinal slot and nearest of third set of lengthwise lines 63b 104

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A slotted ruler comprising a ruler left end, a ruler right end, a ruler length extending from the ruler left end to the ruler right end, a ruler top, a ruler bottom, a ruler width extending from the ruler top to the ruler bottom and generally perpendicular to the ruler length, a ruler rear surface configured to rest on a substrate, a ruler front surface opposite the ruler rear surface, a ruler thickness extending from the ruler front surface to the ruler rear surface and generally perpendicular to the ruler length and ruler width, a straight longitudinal slot having a slot left end located to the right of the ruler left end, a slot right end located to the left of the ruler right end, a slot length extending from the slot left end to the slot right end and generally parallel to the ruler length, the longitudinal slot having a slot top, a slot bottom, a slot width extending from the slot top to the slot bottom and generally parallel to the ruler width and a slot thickness extending from the ruler front surface to the ruler rear surface, wherein the slotted ruler is comprised of a transparent or translucent material, wherein the slot width is between about 0.001 and about 1.0 inches, wherein the slot length and ruler length are between about 4 inches and about 25 inches, wherein the slot length is less than the ruler length, wherein the slotted ruler further comprises a first set of widthwise hatch marks extending generally parallel to the ruler width, adjacent to the ruler top or ruler bottom, and spaced at regular intervals along the ruler length, and a first set of regularly ordered numerical indicia spaced at regular intervals along the ruler length, wherein the ruler comprises a first set of lengthwise lines located above the slot and extending generally parallel to the ruler length, wherein the slotted ruler comprises a second set of lengthwise lines located below the slot and extending generally parallel to the ruler length, wherein the lengthwise lines of the first set of lengthwise lines are equally spaced apart at fractional inch or fractional centimeter intervals, wherein the lengthwise lines of the second set of lengthwise lines are equally spaced apart at fractional inch or fractional centimeter intervals, and further wherein the distance between the lengthwise lines of the first set of lengthwise lines is different than the distance between the lengthwise lines of the second set of lengthwise lines.

2. The slotted ruler of claim 1, wherein the distance between the lengthwise lines of the first set of lengthwise lines is at least double the distance between the lengthwise lines of the second set of lengthwise lines.

3. The slotted ruler of claim 1, wherein the distance between the lengthwise lines of the second set of lengthwise lines is at least double the distance between the lengthwise lines of the first set of lengthwise lines.

4. The slotted ruler of claim 1, wherein the slot width comprises a center, wherein the slotted ruler further comprises a center lengthwise line located at the slot width center and extending generally parallel to the ruler length, wherein the distance between the center lengthwise line and the lengthwise line of the first set of lengthwise lines nearest to the center lengthwise line is equal to the distance between the lengthwise lines of the first set of lengthwise lines, and further wherein the distance between the center lengthwise line and the lengthwise line of the second set of lengthwise lines nearest to the center lengthwise line is equal to the distance between the lengthwise lines of the second set of lengthwise lines.

5. The slotted ruler of claim 1 wherein the slotted ruler further comprises a second set of widthwise hatch marks extending generally parallel to the ruler width, located above and adjacent to the slot top, and spaced at regular intervals along the ruler length and a third set of widthwise hatch marks extending generally parallel to the ruler width, located below and adjacent to the slot bottom, and spaced at regular intervals along the ruler length.

6. The slotted ruler of claim 1 wherein the slotted ruler further comprises a second set of regularly ordered numerical indicia, wherein the first and second set of regularly ordered numerical indicia are located on opposite sides of the longitudinal slot, aligned with each other and spaced at 1 inch or 1 centimeter intervals, and further wherein the slotted ruler further comprises a third set of numerical indicia spaced at 1 inch or 1 centimeter intervals and offset from the first and second set of numerical indicia.

7. The slotted ruler of claim 1 wherein the slotted ruler further comprises a first set of widthwise lines generally perpendicular to the ruler length, an additional set of lengthwise lines generally parallel to the ruler length, the first set of widthwise lines and the additional set of lengthwise lines forming at least one lengthwise row and at least ten widthwise columns of adjoining large rectangles located on one side of the longitudinal slot, wherein the slotted ruler comprises a second set of widthwise lines generally perpendicular to the ruler length and a second set of lengthwise lines generally parallel to the ruler length, the second set of widthwise lines and the second set of lengthwise lines forming at least four lengthwise rows and at least twenty widthwise columns of adjoining squares located on an opposite side of the longitudinal slot, as compared to the adjoining large rectangles, wherein the adjoining large rectangles have a width generally parallel to the ruler width and a length generally parallel to the ruler length, wherein the adjoining squares have a width generally parallel to the ruler width and a length generally parallel to the ruler length, wherein the slotted ruler comprises more adjoining squares than adjoining large rectangles, wherein the median length of the adjoining large rectangles exceeds the median width of the adjoining squares, and further wherein the median surface area of the adjoining large rectangles is larger than the median surface area of each adjoining square, and further wherein at least some the first and second set of widthwise lines are aligned with at least some of each of the widthwise hatch marks adjacent to the ruler top or ruler bottom.

8. The slotted ruler of claim 7 wherein the first set of widthwise hatch marks is adjacent to the ruler top, wherein the slotted ruler further comprises a second set of widthwise hatch marks extending generally parallel to the ruler width, located above and adjacent to the slot top, and spaced at regular intervals along the ruler length, wherein the slotted ruler further comprises a third set of widthwise hatch marks extending generally parallel to the ruler width, located below and adjacent to the slot bottom, and spaced at regular intervals along the ruler length, wherein the slotted ruler further comprises a fourth set of widthwise hatch marks extending generally parallel to the ruler width, adjacent to the ruler bottom, and spaced at regular intervals along the ruler length, wherein at least some of each of the widthwise hatch marks adjacent to the ruler top, ruler bottom, slot top, and slot bottom are aligned and spaced at fractional inch or fractional centimeter intervals, and further wherein at least some of the widthwise hatch marks are aligned with at least some of the widthwise lines forming the adjoining large rectangles and the widthwise lines forming at least some of the adjoining squares.

9. The slotted ruler of claim 7 wherein the slotted ruler further comprises a third set of widthwise lines generally perpendicular to the ruler length, the third set of widthwise lines and the first set of lengthwise lines forming at least two lengthwise rows and at least ten widthwise columns of adjoining small rectangles spaced between the adjoining large rectangles and the longitudinal slot, wherein the adjoining small rectangles have a width parallel to the ruler width and a length parallel to the ruler length, and further wherein the length of the adjoining small rectangles is equal to the length of the adjoining large rectangles and further wherein the width of the adjoining small rectangles is less than the width of the adjoining large rectangles and the width of the adjoining squares.

10. The slotted ruler of claim 1 wherein the first set of widthwise hatch marks are spaced equally along the ruler length at fractional inch or fractional centimeter intervals, and further wherein the slotted ruler further comprises aligned lengthwise hatch marks extending generally parallel to the ruler length located at the ruler left end and the ruler right end, the lengthwise hatch marks spaced equally along the ruler width at fractional inch or fractional centimeter intervals.

11. The slotted ruler of claim 1 wherein the first set of widthwise hatch marks is adjacent to the ruler top, wherein the slotted ruler further comprises a second set of widthwise hatch marks extending generally parallel to the ruler width, located above and adjacent to the slot top, and spaced at regular intervals along the ruler length, wherein the slotted ruler further comprises a third set of widthwise hatch marks extending generally parallel to the ruler width, located below and adjacent to the slot bottom, and spaced at regular intervals along the ruler length, and further wherein the slotted ruler further comprises a fourth set of widthwise hatch marks extending generally parallel to the ruler width, adjacent to the ruler bottom, and spaced at regular intervals along the ruler length.

12. The slotted ruler of claim 1 wherein the slot width is between about 0.001 inches and about 0.1 inches.

13. The slotted ruler of claim 1 wherein the ruler rear surface is flat, wherein all lines and indicia are on the ruler rear surface, wherein the slotted ruler comprises a tapered front, wherein the slotted ruler is in the shape of an isosceles trapezoid and further wherein the ruler thickness at the longitudinal slot is greater than the ruler thickness at the ruler top end and ruler bottom end.

14. The slotted ruler of claim 1 wherein the ruler left end, the ruler right end, the ruler top end and the ruler bottom end are straight.

15. The slotted ruler of claim 1 wherein the slot left end, the slot right end, the slot top and the slot bottom are straight.

16. A slotted ruler comprising a ruler left end, a ruler right end, a ruler length extending from the ruler left end to the ruler right end, a ruler top, a ruler bottom, a ruler width extending from the ruler top to the ruler bottom and generally perpendicular to the ruler length, a ruler rear surface configured to rest on a substrate, a ruler front surface opposite the ruler rear surface, a ruler thickness extending from the ruler front surface to the ruler rear surface and generally perpendicular to the ruler length and ruler width, a straight longitudinal slot having a slot left end located to the right of the ruler left end, a slot right end located to the left of the ruler right end, a slot length extending from the slot left end to the slot right end and generally parallel to the ruler length, the longitudinal slot having a slot top, a slot bottom, a slot width extending from the slot top to the slot bottom and generally parallel to the ruler width and a slot thickness extending from the ruler front surface to the ruler rear surface, wherein the slotted ruler is comprised of a transparent or translucent material, wherein the slot width is between about 0.001 and about 1.0 inches, wherein the slot length and ruler length are between about 4 inches and about 25 inches, wherein the slot length is less than the ruler length, and further wherein the slotted ruler further comprises a first set of widthwise hatch marks extending generally parallel to the ruler width, adjacent to the ruler top, and spaced at regular intervals along the ruler length, a second set of widthwise hatch marks extending generally parallel to the ruler width, adjacent to the ruler bottom, and spaced at regular intervals along the ruler length, and a first set of regularly ordered numerical indicia spaced at regular intervals along the ruler length, and further wherein the slotted ruler further comprises a first set of widthwise lines generally perpendicular to the ruler length and a first set of lengthwise lines generally parallel to the ruler length, the first set of widthwise lines and the first set of lengthwise lines forming at least one lengthwise row and at least ten widthwise columns of adjoining large rectangles located on one side of the longitudinal slot, wherein the slotted ruler comprises a second set of widthwise lines generally perpendicular to the ruler length and a second set of lengthwise lines generally parallel to the ruler length, the second set of widthwise lines and the second set of lengthwise lines forming at least four lengthwise rows and at least twenty widthwise columns of adjoining squares located on an opposite side of the longitudinal slot, as compared to the adjoining large rectangles, wherein the adjoining large rectangles have a width generally parallel to the ruler width and a length generally parallel to the ruler length, wherein the adjoining squares have a width parallel to the ruler width and a length parallel to the ruler length, wherein the slotted ruler comprises more adjoining squares than adjoining large rectangles, wherein the median length of the adjoining large rectangles exceeds the median width of the adjoining squares, and further wherein the median surface area of the adjoining large rectangles is larger than the median surface area of each adjoining square, and further wherein at least some the first and second set of widthwise lines are aligned with at least some of each of the widthwise hatch marks adjacent to the ruler top and ruler bottom.

17. The slotted ruler of claim 16 wherein the slotted ruler further comprises a third set of widthwise hatch marks extending generally parallel to the ruler width, located above and adjacent to the slot top, and spaced at regular intervals along the ruler length and fourth set of widthwise hatch marks extending generally parallel to the ruler width, located below and adjacent to the slot top, and spaced at regular intervals along the ruler length.

18. The slotted ruler of claim 17 wherein at least some of each of the widthwise hatch marks adjacent to the ruler top, ruler bottom, slot top, and slot bottom are aligned and spaced at fractional inch or fractional centimeter intervals.

19. The slotted ruler of claim 16 wherein the slotted ruler further comprises a second set of regularly ordered numerical indicia, wherein the first and second set of regularly ordered numerical indicia are located on opposite sides of the longitudinal slot, aligned with each other and spaced at 1 inch or 1 centimeter intervals.

20. The slotted ruler of claim 19 wherein the slotted ruler further comprises a third set of numerical indicia spaced at 1 inch or 1 centimeter intervals and offset from the first and second set of numerical indicia.

21. The slotted ruler of claim 16 wherein the widthwise lines forming the adjoining large rectangles are aligned with the widthwise lines forming at least some of the adjoining squares.

22. The slotted ruler of claim 16 wherein the slotted ruler further comprises a third set of widthwise hatch marks extending generally parallel to the ruler width, located below and adjacent to the slot bottom, and spaced at regular intervals along the ruler length, wherein the slotted ruler further comprises a fourth set of widthwise hatch marks extending generally parallel to the ruler width, adjacent to the ruler bottom, and spaced at regular intervals along the ruler length, wherein at least some of each of the widthwise hatch marks adjacent to the ruler top, ruler bottom, slot top, and slot bottom are aligned and spaced at fractional inch or fractional centimeter intervals, and further wherein at least some of the widthwise hatch marks are aligned with at least some of the widthwise lines forming the adjoining large rectangles and the widthwise lines forming at least some of the adjoining squares.

23. The slotted ruler of claim 16 wherein the slotted ruler further comprises a third set of widthwise lines generally perpendicular to the ruler length and a third set of lengthwise lines generally parallel to the ruler length, the third set of widthwise lines and the third set of lengthwise lines forming at least two lengthwise rows and at least ten widthwise columns of adjoining small rectangles spaced between the adjoining large rectangles and the longitudinal slot, wherein the adjoining small rectangles have a width parallel to the ruler width and a length parallel to the ruler length, and further wherein the length of the adjoining small rectangles is equal to the length of the adjoining large rectangles and further wherein the width of the adjoining small rectangles is less than the width of the adjoining large rectangles and the width of the adjoining squares.

24. The slotted ruler of claim 16 wherein the slotted ruler further comprises aligned lengthwise hatch marks extending generally parallel to the ruler length located at the ruler left end and the ruler right end, the lengthwise hatch marks spaced equally along the ruler width at fractional inch or fractional centimeter intervals.

* * * * *